(12) United States Patent
Duffy et al.

(10) Patent No.: US 11,618,550 B2
(45) Date of Patent: Apr. 4, 2023

(54) FOLDABLE ROTOR ASSEMBLY FOR FIXED-WING VTOL AIRCRAFT

(71) Applicant: The Boeing Company, Chicago, IL (US)

(72) Inventors: Michael J. Duffy, Lansing, NY (US); Matthew S. Stauffer, Summerville, SC (US)

(73) Assignee: The Boeing Company, Chicago, IL (US)

( * ) Notice: Subject to any disclaimer, the term of this patent is extended or adjusted under 35 U.S.C. 154(b) by 146 days.

(21) Appl. No.: 17/220,097

(22) Filed: Apr. 1, 2021

(65) Prior Publication Data

US 2021/0237853 A1  Aug. 5, 2021

Related U.S. Application Data

(63) Continuation of application No. 15/713,432, filed on Sep. 22, 2017, now Pat. No. 10,994,829.

(51) Int. Cl.
| | |
|---|---|
| *B64C 11/28* | (2006.01) |
| *B64C 39/02* | (2023.01) |
| *B64C 11/04* | (2006.01) |
| *B64C 27/30* | (2006.01) |
| *B64C 29/00* | (2006.01) |
| *B64C 27/26* | (2006.01) |
| *B64C 27/473* | (2006.01) |
| *B64U 30/10* | (2023.01) |
| *B64U 30/20* | (2023.01) |
| *B64U 70/80* | (2023.01) |

(52) U.S. Cl.
CPC .............. *B64C 11/28* (2013.01); *B64C 11/04* (2013.01); *B64C 27/26* (2013.01); *B64C 27/30* (2013.01); *B64C 27/473* (2013.01); *B64C 29/0025* (2013.01); *B64C 39/024* (2013.01); *B64U 30/10* (2023.01); *B64U 30/20* (2023.01); *B64U 70/80* (2023.01)

(58) Field of Classification Search
CPC ......... B64C 11/28; B64C 27/26; B64C 27/30; B64C 27/50; B64C 29/0025
See application file for complete search history.

(56) References Cited

U.S. PATENT DOCUMENTS

| | | | |
|---|---|---|---|
| RE21,478 E | * 6/1940 | Smith | ..................... B64C 27/26 244/6 |
| 2,687,779 A | 8/1954 | Peterson | |

(Continued)

OTHER PUBLICATIONS

Chinese office action; Application 201810980222.2; dated Dec. 16, 2022.

*Primary Examiner* — Philip J Bonzell
*Assistant Examiner* — Michael B. Kreiner
(74) *Attorney, Agent, or Firm* — Duft & Bornsen, PC

(57) ABSTRACT

A rotor assembly for a fixed-wing VTOL aircraft. The rotor assembly is configured to provide vertical flight for the fixed-wing VTOL aircraft. In one embodiment, the rotor assembly includes a hub assembly, a first rotor blade affixed to the hub assembly, and a second rotor blade affixed to the hub assembly. The hub assembly orients the second rotor blade in relation to the first rotor blade about an axis of rotation of the hub assembly with the first rotor blade and the second rotor blade vertically stacked when the hub assembly is stopped for wing-borne flight.

20 Claims, 16 Drawing Sheets

(56) References Cited

U.S. PATENT DOCUMENTS

| | | | | |
|---|---|---|---|---|
| 3,811,642 A * | 5/1974 | Prather | ................... | B64C 31/04 244/65 |
| 3,995,793 A * | 12/1976 | Wing | ...................... | B64C 27/22 244/17.23 |
| 6,622,962 B1 * | 9/2003 | White | ..................... | B64C 27/26 244/12.3 |
| 8,089,034 B2 * | 1/2012 | Hammerquist | ......... | F42B 10/14 244/3.28 |
| 8,376,264 B1 * | 2/2013 | Hong | ................... | B64C 27/605 244/17.23 |
| D710,782 S * | 8/2014 | Cummings | .................. | D12/326 |
| 9,284,962 B2 * | 3/2016 | Long | .................... | B64C 27/50 |
| 9,783,288 B1 * | 10/2017 | Moore | ................... | B64C 27/24 |
| 9,896,197 B2 * | 2/2018 | Vetter | ..................... | B64C 27/10 |
| 10,112,698 B2 * | 10/2018 | Barnes | ................. | B64C 39/024 |
| 10,392,104 B1 * | 8/2019 | Urban | .................... | B64C 27/52 |
| 10,399,666 B2 * | 9/2019 | Beckman | ............... | B64C 11/28 |
| 10,494,088 B1 * | 12/2019 | Coralic | .................. | B64C 27/82 |
| 10,669,869 B1 * | 6/2020 | Urban | .................... | B64C 11/28 |
| 10,994,836 B2 * | 5/2021 | Shiosaki | ................ | B64D 35/00 |
| 2011/0180673 A1 * | 7/2011 | Lim | .................... | B64C 29/0025 244/7 A |
| 2014/0084114 A1 * | 3/2014 | Valentin | .................. | B64C 27/28 244/7 R |
| 2018/0093753 A1 * | 4/2018 | Chow | ....................... | B64C 1/30 |

* cited by examiner

FOLDABLE ROTOR ASSEMBLY FOR FIXED-WING VTOL AIRCRAFT

RELATED APPLICATIONS

This non-provisional application is a continuation of co-pending U.S. patent application Ser. No. 15/713,432 filed on Sep. 22, 2017, which is incorporated herein by reference.

FIELD

This disclosure relates to the field of rotors for Vertical Take-Off and Landing (VTOL) aircraft.

BACKGROUND

A type of aircraft that can take off, hover, and land vertically is referred to as a VTOL aircraft. A VTOL aircraft has one or more rotors that produce vertical lift. Some VTOL aircraft also have fixed-wings that generate lift when the aircraft is propelled forward by a propeller, a jet engine, etc. When these fixed-wing aircraft convert from vertical flight to horizontal or wing-borne flight, the hover rotor(s) turns off. One problem is that the hover rotor(s) can produce drag when stopped, and hinder wing-borne flight.

SUMMARY

Embodiments described herein provide for an improved rotor assembly for a fixed-wing VTOL aircraft where the blades of the rotor assembly fold when the rotor assembly is stopped. Due to the structure of the rotor assembly, the blades are able to be stacked vertically in relation to each other. Because the blades are able to be stacked in this manner, the width of the rotor assembly is reduced and produces less drag when the VTOL aircraft is engaged in wing-borne flight.

One embodiment comprises a hub assembly that includes a first rotor blade and a second rotor blade each connected to the hub assembly and stacked vertically along different horizontal planes.

In another embodiment, the hub assembly further comprises an inner hub and an outer hub. The inner hub includes a first body member rigidly mounted on an output shaft of a motor, and a first blade grip that attaches to the first rotor blade. The outer hub includes a second body member mounted on the inner hub via an angular contact bearing to allow the outer hub to rotate in relation to the inner hub, and a second blade grip that attaches to the second rotor blade.

Another embodiment comprises a fixed-wing VTOL aircraft comprising a rotor assembly configured to provide vertical flight. The rotor assembly includes a hub assembly, a first rotor blade affixed to the hub assembly, and a second rotor blade affixed to the hub assembly. The hub assembly orients the second rotor blade in relation to the first rotor blade about an axis of rotation of the hub assembly with the first rotor blade and the second rotor blade vertically stacked when the hub assembly is stopped for wing-borne flight.

In another embodiment, the hub assembly orients the second rotor blade at a first azimuthal position in relation to the first rotor blade about the axis of rotation when the hub assembly rotates for vertical flight.

In another embodiment, the hub assembly orients the second rotor blade at the first azimuthal position that is diametrically opposite to the first rotor blade about the axis of rotation.

In another embodiment, the rotor assembly further includes a third rotor blade affixed to the hub assembly. The hub assembly orients the third rotor blade at a second azimuthal position in relation to the first rotor blade about the axis of rotation when the hub assembly rotates for vertical flight. The first rotor blade, the second rotor blade at the first azimuthal position, and the third rotor blade at the second azimuthal position are symmetric around the axis of rotation. The hub assembly orients the third rotor blade in relation to the first rotor blade about the axis of rotation with the first rotor blade, the second rotor blade, and the third rotor blade vertically stacked when the hub assembly is stopped for wing-borne flight.

In another embodiment, the hub assembly includes an inner hub and an outer hub. The inner hub includes a first body member rigidly mounted on an output shaft of a motor, and a first blade grip that attaches to the first rotor blade. The outer hub includes a second body member mounted on the inner hub via an angular contact bearing to allow the outer hub to rotate in relation to the inner hub, and a second blade grip that attaches to the second rotor blade.

In another embodiment, the first body member of the inner hub has a cylindrical outer surface, and the angular contact bearing mounts on the cylindrical outer surface. The second body member of the outer hub mounts on the angular contact bearing.

In another embodiment, the first body member of the inner hub has a cylindrical aperture that slides onto the output shaft above the motor. An inner race of the angular contact bearing is mounted on the cylindrical outer surface of the first body member above the first blade grip. The second body member of the outer hub is mounted on an outer race of the angular contact bearing to position the second rotor blade on a different plane than the first rotor blade.

In another embodiment, the first body member of the inner hub has a cylindrical aperture so that the inner hub encompasses the motor. An inner race of the angular contact bearing is mounted on the cylindrical outer surface of the first body member above the first blade grip and around a portion of the inner hub that encompasses the motor. The second body member of the outer hub is mounted on an outer race of the angular contact bearing to position the second rotor blade on a different plane than the first rotor blade.

In another embodiment, the first body member of the inner hub has a cylindrical aperture that slides onto the output shaft above the motor. The first blade grip of the inner hub comprises a first arm and a second arm that extend from the first body member and are separated by a gap. An inner race of the angular contact bearing is mounted on the cylindrical outer surface of the first body member in the gap between the first arm and the second arm. The second body member of the outer hub is mounted on an outer race of the angular contact bearing to position the second rotor blade co-planar with the first rotor blade. The second blade grip of the outer hub pivotally connects to the second rotor blade to allow the second rotor blade to pivot in relation to the outer hub to vertically stack with the first rotor blade.

In another embodiment, the first body member of the inner hub has a cylindrical aperture that slides onto the output shaft above the motor. The first blade grip of the inner hub comprises a first arm and a second arm that extend from the first body member and are separated by a gap. An inner race of the angular contact bearing is mounted on the cylindrical outer surface of the first body member in the gap between the first arm and the second arm. The second body member of the outer hub is mounted on an outer race of the angular contact bearing. The inner race has a sloped slot that provides axial translation of the outer race in relation to the inner race when the outer hub rotates to position the second rotor blade and the first rotor blade co-planar when diametrically opposite about the axis of rotation, and to position the second rotor blade on a different plane than the first rotor blade when vertically stacked.

In another embodiment, the rotor assembly further includes a first rotational coupler that couples the outer hub to the inner hub when the inner hub rotates so that the second rotor blade is diametrically opposite to the first rotor blade about the axis of rotation.

In another embodiment, the rotor assembly further includes a second rotational coupler that couples the outer hub to the inner hub when the inner hub stops rotation so that the first rotor blade and the second rotor blade are vertically stacked.

In another embodiment, the first rotational coupler comprises a first tab that projects from the outer hub to engage with a second tab that projects from the inner hub to couple the outer hub to the inner hub when the inner hub rotates so that the second rotor blade is diametrically opposite to the first rotor blade about the axis of rotation. The second rotational coupler comprises a third tab that projects from the outer hub to engage with the second tab that projects from the inner hub to couple the outer hub to the inner hub when the inner hub stops rotation so that the first rotor blade and the second rotor blade are vertically stacked. The outer hub is able to rotate 180° in relation to the inner hub between the first rotational coupler and the second rotational coupler.

In another embodiment, the hub assembly further includes a torsion spring connected between the inner hub and the outer hub.

Another embodiment comprises a fixed-wing VTOL aircraft comprising a rotor assembly configured to provide vertical flight. The rotor assembly includes a hub assembly comprising an inner hub that is rigidly mounted on an output shaft of a motor, and that secures a first rotor blade. The hub assembly comprises an outer hub that mounts on the inner hub via an angular contact bearing to allow the outer hub to rotate in relation to the inner hub, and that secures a second rotor blade. The hub assembly comprises a first rotational coupler that couples the outer hub to the inner hub so that the second rotor blade is at an angle in relation to the first rotor blade about an axis of rotation of the hub assembly when the rotor assembly is deployed for vertical flight. The outer hub rotates in relation to the inner hub so that the first rotor blade and the second rotor blade are vertically stacked when the rotor assembly is folded for wing-borne flight.

In another embodiment, the hub assembly further comprises a second rotational coupler that couples the outer hub to the inner hub so that the first rotor blade and the second rotor blade are vertically stacked when the rotor assembly is folded.

In another embodiment, the angle is 180° when the rotor assembly is deployed.

In another embodiment, the second rotor blade is on a different plane than the first rotor blade when the rotor assembly is deployed, and the second rotor blade is on the different plane than the first rotor blade when the rotor assembly is folded.

In another embodiment, the second rotor blade is co-planar with the first rotor blade when the rotor assembly is deployed, and the second rotor blade is on a different plane than the first rotor blade when the rotor assembly is folded.

In another embodiment, the second rotor blade is co-planar with the first rotor blade when the rotor assembly is deployed, the second rotor blade is co-planar with the first rotor blade when the rotor assembly is folded, and the second rotor blade is pivotally connected to the outer hub to allow the first rotor blade and second rotor blade to vertically stack.

In another embodiment, the hub assembly further includes a torsion spring connected between the inner hub and the outer hub.

Another embodiment comprises a rotor assembly for a fixed-wing VTOL aircraft. The rotor assembly includes a hub assembly comprising an inner hub that secures a first rotor blade, and an outer hub that secures a second rotor blade. The inner hub rigidly mounts on an output shaft of a motor. The outer hub mounts on the inner hub via an angular contact bearing. The outer hub rotates on the angular contact bearing in relation to the inner hub between a first orientation where the first rotor blade is diametrically opposite to the second rotor blade about an axis of rotation of the hub assembly when the hub assembly rotates, and a second orientation where the first rotor blade and the second rotor blade are vertically stacked when the hub assembly is stopped.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
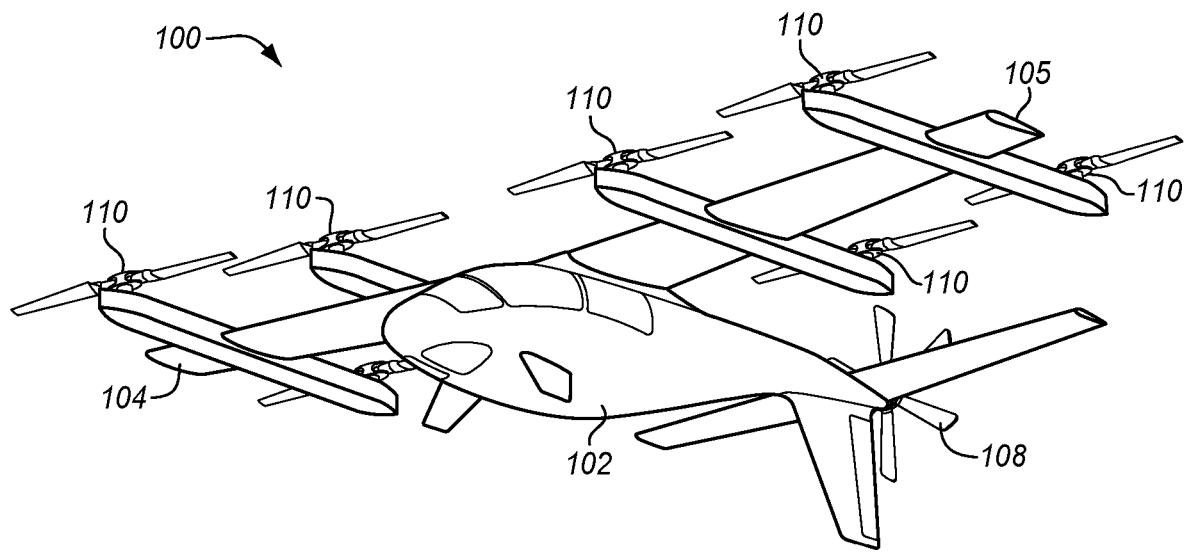
FIGS. 1-2 are isometric views of a fixed-wing VTOL aircraft in an exemplary embodiment.
Figure 2:
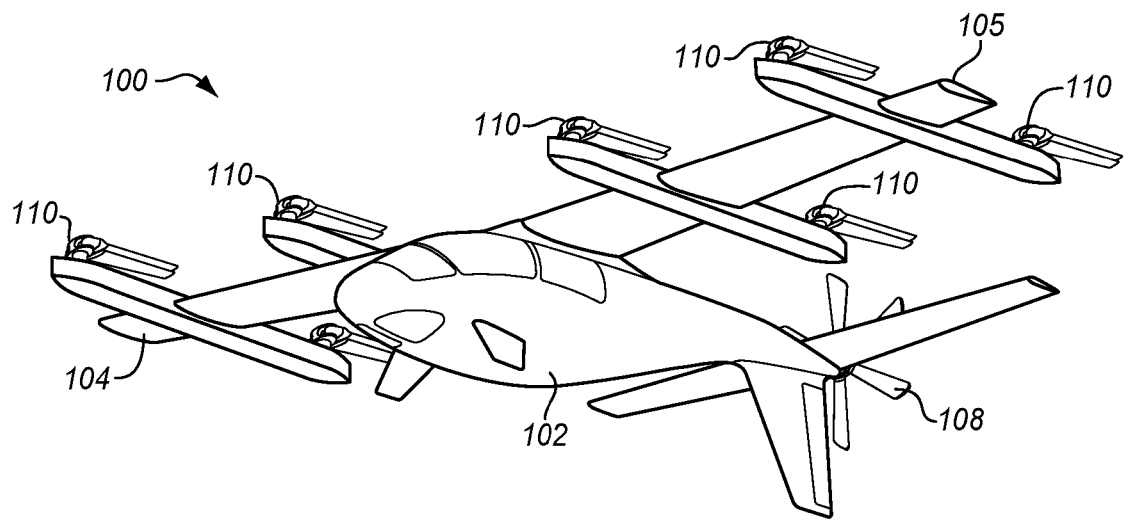

FIGS. 1-2 are isometric views of a fixed-wing VTOL aircraft 100 in an exemplary embodiment. Aircraft 100 may be a manned aircraft that is flown with one or more pilots, or may be an unmanned aircraft (e.g., a drone). The structure of aircraft 100 is merely provided as an example, and the concepts described herein apply to any fixed-wing VTOL aircraft. In this example, aircraft 100 includes a fuselage 102, and wings 104-105 extending from opposite sides of fuselage 102 to define a support plane for horizontal or wing-borne flight. Aircraft 100 also includes a propeller 108 that provides thrust for wing-borne flight, although other types of engines may be used to generate thrust.

To provide vertical flight (i.e., take-off, hover, and landing), aircraft 100 includes one or more rotor assemblies 110. The number and locations of the rotor assemblies 110 shown in FIGS. 1-2 are merely for example, and may vary as desired. Rotor assemblies 110 are able to switch between a deployed configuration and a folded or stowed configuration. In FIG. 1, the rotor blades of rotor assemblies 110 are deployed. As rotor assemblies 110 spin via a motor, the rotor assemblies 110 provide vertical lift so that aircraft 100 is able to take-off, hover, and land. In FIG. 2, when aircraft 100 transitions from vertical flight to wing-borne flight, the rotor blades of rotor assemblies 110 are able to fold to reduce drag. In the embodiments described herein, rotor assemblies 110 are enhanced in that the rotor blades are stacked on top of one another when folded. Because the rotor blades are stacked, the width of rotor assemblies 110 is smaller than conventional rotor assemblies, which advantageously reduces drag from rotor assemblies 110 during wing-borne flight.

Figure 3:
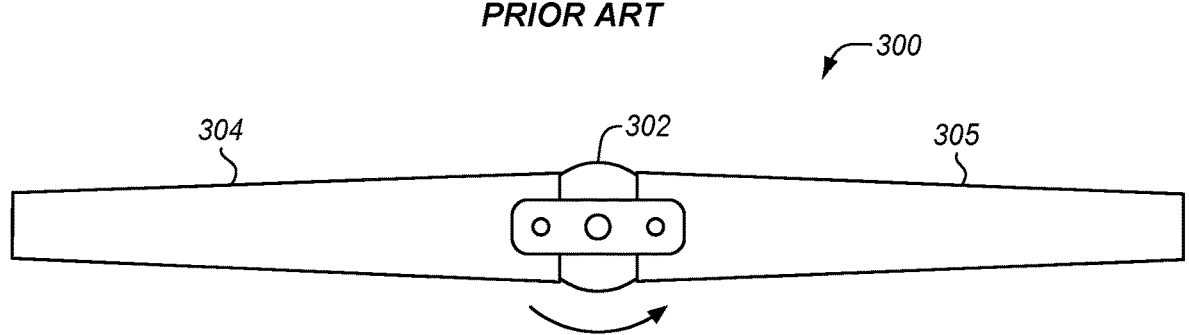
FIG. 3 is a top view of a conventional rotor assembly in a deployed configuration.
Figure 4:
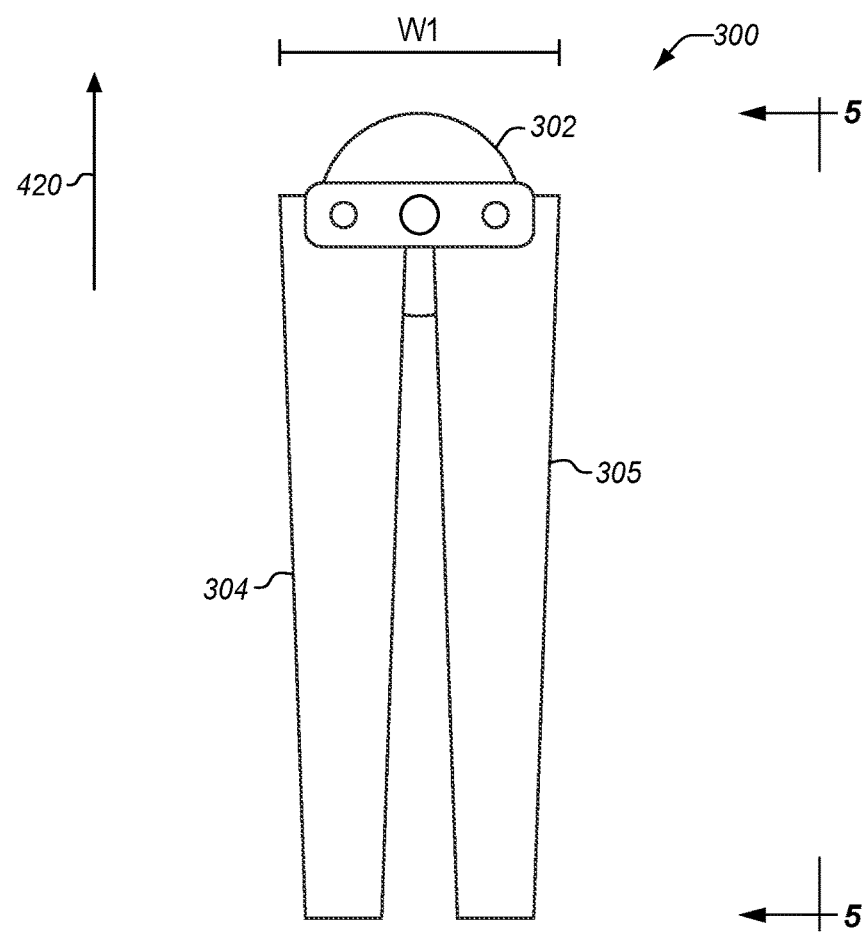
FIG. 4 is a top view of a conventional rotor assembly in a folded configuration.
Figure 5:
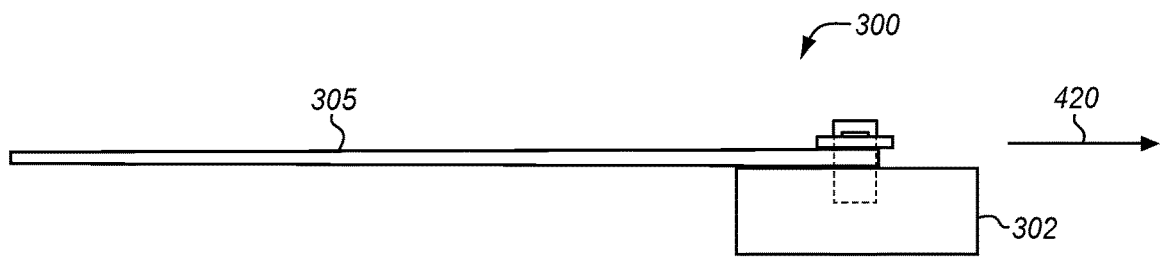
FIG. 5 is a side view of a conventional rotor assembly in a folded configuration.

To illustrate the technical benefit of the embodiments described herein, FIGS. 3-5 show a conventional rotor assembly 300 that is foldable. FIG. 3 is a top view of rotor assembly 300. Rotor assembly 300 includes a hub 302 and rotor blades 304-305. Rotor blades 304-305 are pivotally connected to hub 302 on opposing sides so that they project radially in opposite directions from the axis of rotation of hub 302 when deployed. Although not evident in FIG. 3, rotor blades 304-305 are co-planar. FIG. 4 is a top view of rotor assembly 300 in a folded configuration. When rotor assembly 300 is stopped, rotor blades 304-305 are able to fold backward and opposite the direction of forward travel of an aircraft (indicated by arrow 420). FIG. 5 is a side view of rotor assembly 300 in a folded configuration. The view in FIG. 5 is from view arrows 5-5 in FIG. 4. When folded, rotor blade 305 is visible in this side view. Because rotor blades 304-305 are co-planar, rotor blade 304 is behind rotor blade 305 into the page and is not visible. Although rotor assembly 300 is foldable as illustrated in FIGS. 4-5, the width (W1 in FIG. 4) of rotor assembly 300 when folded may create an undesirable amount of drag for wing-borne flight.

Figure 6:
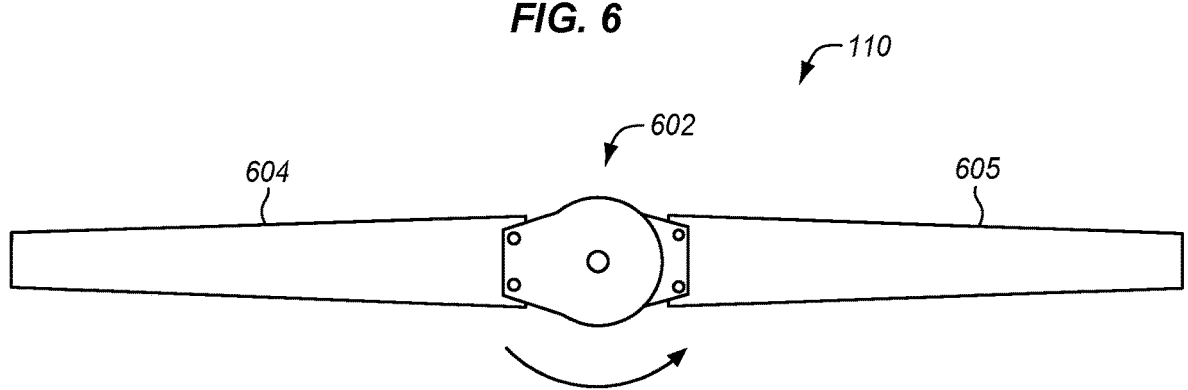
FIG. 6 is a top view of a rotor assembly in a deployed configuration in an exemplary embodiment.
Figure 7:
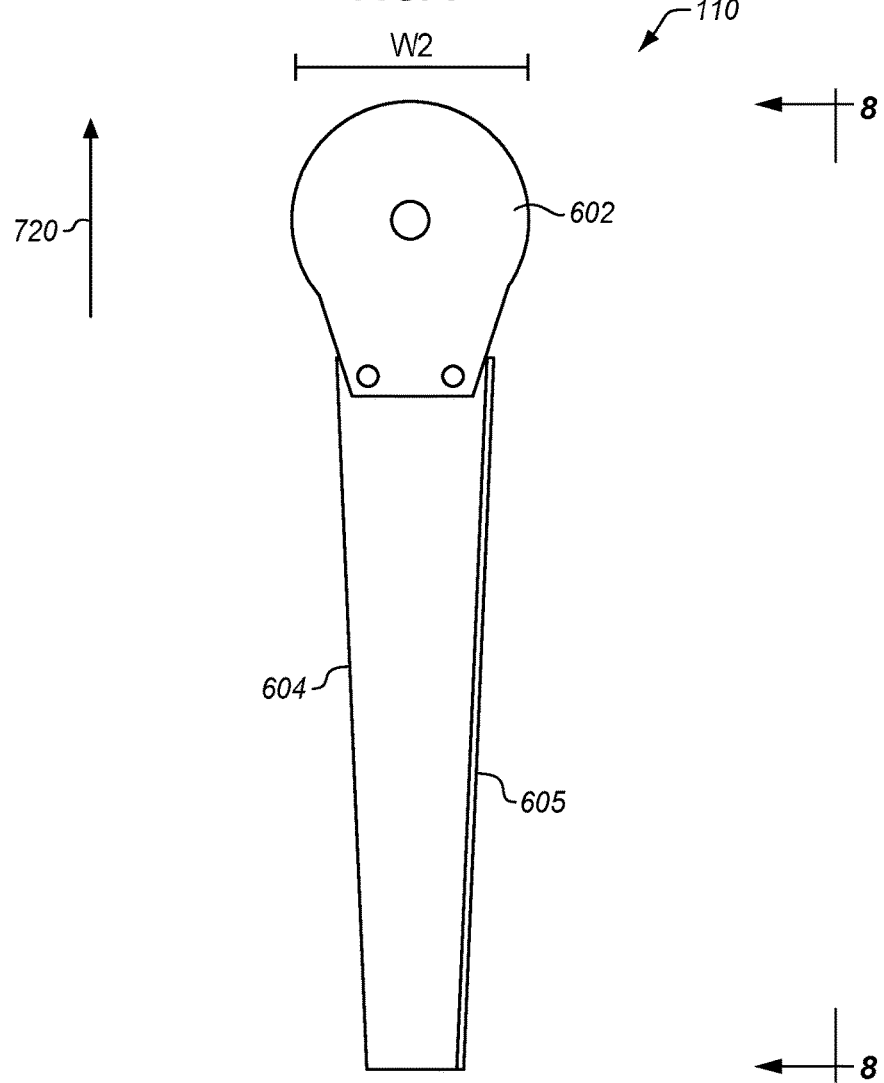
FIG. 7 is a top view of a rotor assembly in a folded configuration in an exemplary embodiment.
Figure 8:
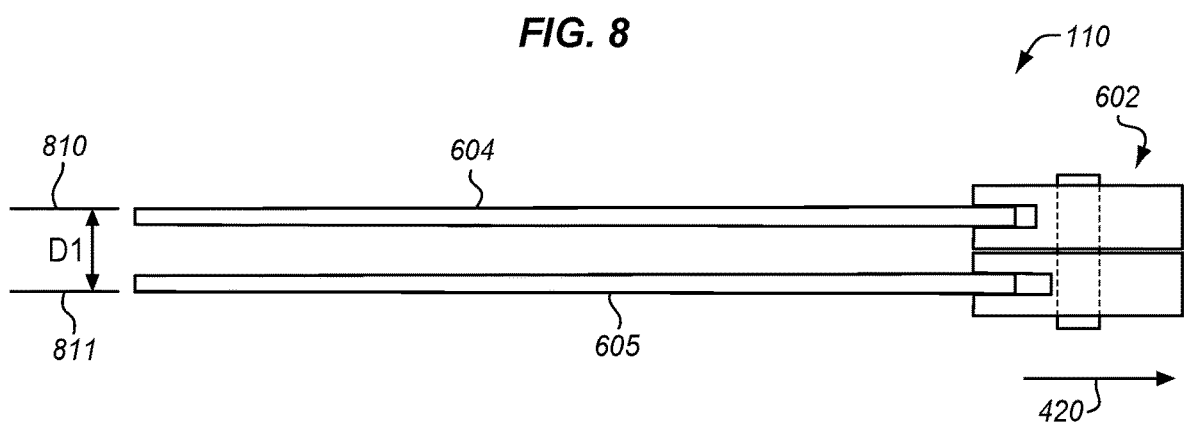
FIG. 8 is a side view of a rotor assembly in a folded configuration in an exemplary embodiment.

FIGS. 6-8 illustrate rotor assembly 110 for aircraft 100, or another aircraft, that is foldable in an exemplary embodiment. The illustration of rotor assembly 110 in FIGS. 6-8 is to show how rotor assembly 110 is able to fold as compared to conventional rotor assemblies. FIG. 6 is a top view of rotor assembly 110 in an exemplary embodiment. Rotor assembly 110 includes a hub assembly 602 and rotor blades 604-605. Hub assembly 602 orients rotor blades 604-605 to project radially in opposite directions from the axis of rotation of hub assembly 602 when deployed. As described in further detail below, when rotor blades 604-605 are deployed, the major surfaces of rotor blades 604-605 may be co-planar or may be on different planes. FIG. 7 is a top view of rotor assembly 110 in a folded configuration in an exemplary embodiment. When rotor assembly 110 is stopped for wing-borne flight, hub assembly 602 orients rotor blade 604 in relation to rotor blade 605 about an axis of rotation of hub assembly 602 so that rotor blades 604-605 are vertically stacked. Thus, rotor blades 604-605 are able to fold backward and opposite the direction of forward travel of an aircraft (indicated by arrow 720). Both rotor blades 604-605 extend radially in the same direction from the axis of rotation of hub assembly 602, and are stacked vertically along the same radial direction from hub assembly 602. To be vertically stacked means that the rotor blades 604-605 are situated on different horizontal planes (defined by the major surfaces of rotor blades 604-605), and at least a portion of a rotor blade 604 overlaps rotor blade 605 along a vertical plane that is transverse to the horizontal planes of the rotor blades. FIG. 8 is a side view of rotor assembly 110 in a folded configuration in an exemplary embodiment. The view in FIG. 8 is from view arrows 8-8 in FIG. 7. When folded, rotor blade 604 is vertically stacked on top of rotor blade 605. Rotor blade 604 is on a first horizontal plane 810, and rotor blade 605 is on a second horizontal plane 811 that is spaced apart from plane 810 by a distance D1. Because rotor blades 604-605 are stacked in this manner, the width (W2 in FIG. 7) of rotor assembly 110 is smaller than conventional rotor assemblies so that drag is reduced for wing-borne flight.

Figure 9:
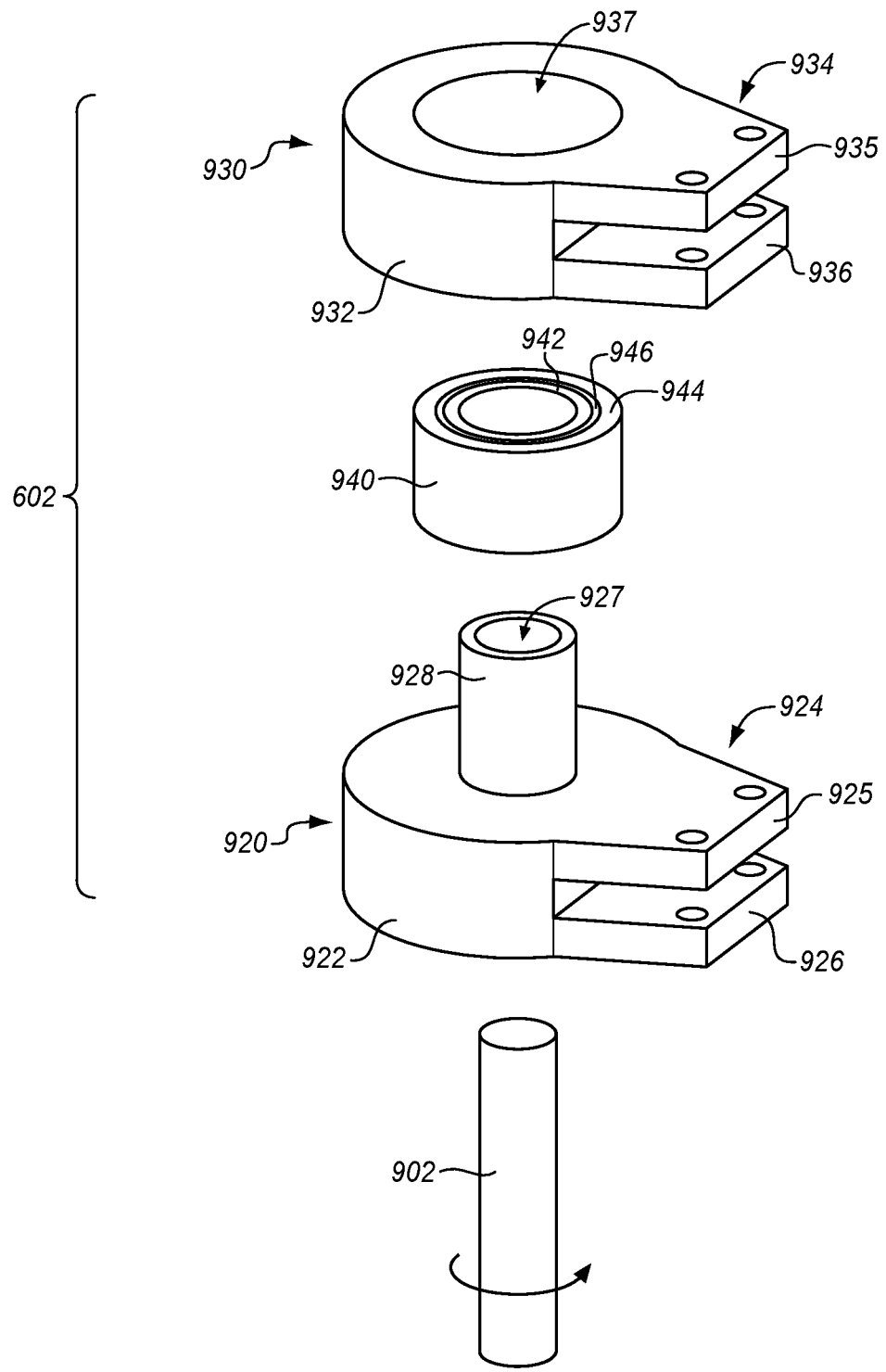
FIG. 9 is a schematic view of a hub assembly in an exemplary embodiment.

FIG. 9 is a schematic view of hub assembly 602 in an exemplary embodiment. Hub assembly 602 is mounted on an output shaft 902 that is driven to rotate by a motor (not shown). Hub assembly 602 is a multi-piece unit that includes an inner hub 920, an outer hub 930, and one or more angular contact bearings 940. The structure illustrated in FIG. 9 is for a two rotor assembly, although more hubs may be used if more than two rotors are implemented. Inner hub 920 includes a body member 922 and a blade grip 924 integral with body member 922 or connected to body member 922. Body member 922 of inner hub 920 has a cylindrical aperture 927 that slides onto output shaft 902, and body member 922 is rigidly affixed to output shaft 902. At least a portion of inner hub 920 has a cylindrical outer surface 928 to provide a surface for mounting angular contact bearing(s) 940. Blade grip 924 is configured to attach to or secure an end of a rotor blade. Blade grip 924 includes a pair of arms 925-926 that extend from body member 922 with a gap between the arms 925-926. An end of a rotor blade may be slid into the gap between arms 925-926, and affixed to arms 925-926 with bolts, screws, or some other fastener.

Outer hub 930 includes a body member 932 and a blade grip 934 integral with body member 932 or connected to body member 932. Body member 932 has a cylindrical aperture 937 where angular contact bearing(s) 940 is mounted. Blade grip 934 is configured to attach to or secure an end of a rotor blade. Blade grip 934 includes a pair of arms 935-936 that extend from body member 932 with a gap between the arms 935-936. An end of a rotor blade may be slid into the gap between arms 935-936, and affixed to arms 935-936 with bolts, screws, or some other fastener.

Angular contact bearing 940 has an inner race 942, an outer race 944, and rolling elements 946 between inner race 942 and outer race 944 that enable rotational movement, such as ball bearings, roller bearings, etc. Inner race 942 mounts on inner hub 920, or more particularly, on cylindrical outer surface 928 of inner hub 920. Thus, inner race 942 is sized to fit on cylindrical outer surface 928 of inner hub 920 in this embodiment. In other embodiments, inner race 942 may be sized to fit on output shaft 902 or another surface. Outer race 944 mounts in body member 932 of outer hub 930, and is sized to fit in cylindrical aperture 937 of outer hub 930.

With this arrangement, inner hub 920 is directly driven to rotate due to its rigid connection with output shaft 902. Because outer hub 930 is mounted on angular contact bearing 940, outer hub 930 is not directly driven by output shaft 902, and is able to rotate in relation to inner hub 920/output shaft 902. This is advantageous in that outer hub 930 may rotate (due to drag force) in relation to inner hub 920 during wing-borne flight so that a rotor blade connected to outer hub 930 is vertically stacked with a rotor blade connected to inner hub 920.

The structure of hub assembly 602 may vary as desired in other embodiments, with each variation having the characteristic that outer hub 930 is able to rotate in relation to inner hub 920. For instance, the shapes and profiles of inner hub 920 and outer hub 930 may vary in other embodiments from what is illustrated in FIG. 9. Angular contact bearing 940 may be mounted on output shaft 902 as opposed to being mounted on inner hub 920 in other embodiments. Outer hub 930 may be mounted below inner hub 920 in other embodiments.

Although outer hub 930 is able to rotate in relation to inner hub 920 via angular contact bearing 940, outer hub 930 couples with inner hub 920 at one or more points along the axis of rotation of hub assembly 602. Inner hub 920 may drive outer hub 930 when rotor assembly 110 is deployed for vertical flight. Thus, outer hub 930 couples with inner hub 920 at a certain point along the axis of rotation so that the rotor blades are properly oriented for vertical flight. For example, in a two rotor assembly, the rotor blades will be diametrically opposite on hub assembly 602 (i.e., 180° apart) in a deployed configuration (see FIG. 6). Outer hub 930 may also couple with inner hub 930 when their blade grips 924, 934 are vertically aligned or substantially aligned. That way, the rotor blades being secured by blade grips 924, 934 will be axially or vertically stacked in a folded configuration (see FIG. 8). To couple outer hub 930 to inner hub 920 at one or more points, rotational couplers may be implemented as shown in FIGS. 10-11.

Figure 10:
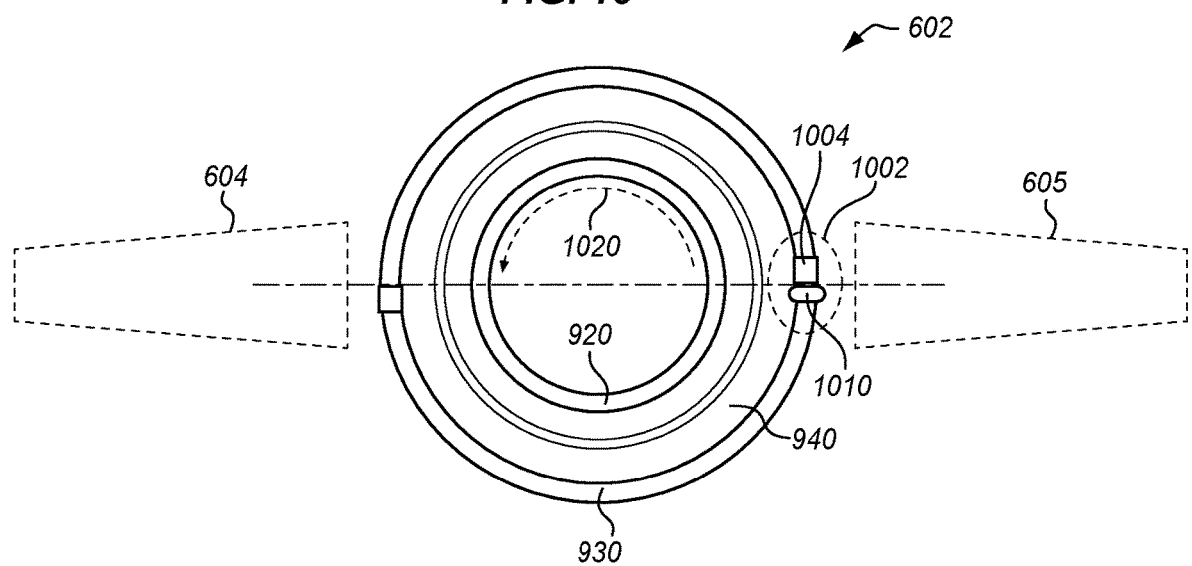
FIGS. 10-11 are schematic views of a cross-section of a hub assembly in an exemplary embodiment.
Figure 11:
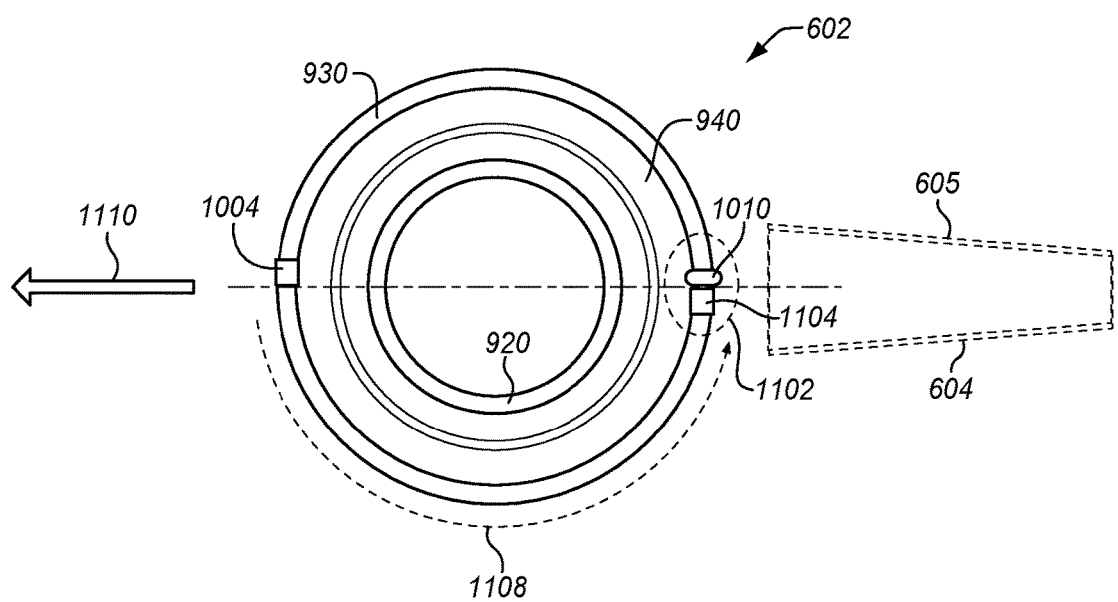

FIGS. 10-11 are schematic views of a cross-section of hub assembly 602 in an exemplary embodiment. In FIG. 10, angular contact bearing 940 is mounted on inner hub 920, and outer hub 930 is mounted on angular contact bearing 940 so that outer hub 930 is able to rotate in relation to inner hub 920. Blade grips 924, 934 have been omitted to simplify FIGS. 10-11, but it is understood that blade grip 924 secures rotor blade 605 and blade grip 934 secures rotor blade 604. Hub assembly 602 includes a rotational coupler 1002 that couples outer hub 930 to inner hub 920 at a certain point along the axis of rotation of hub assembly 602 for vertical flight. A rotational coupler comprises any structure or device that joins, links, or otherwise couples outer hub 930 to inner hub 920 at a certain point along the axis of rotation. A point along the axis of rotation of hub assembly 602 may also be referred to as an orientation or an azimuthal position, which is a location along the axis of rotation defined by an angle between a long axis of rotor blade 605 and a long axis of rotor blade 604. For example, the long axis of rotor blade 605 may be considered a reference vector, and an azimuthal position is defined by an angle between the reference vector and the long axis of rotor blade 604 along the axis of rotation of hub assembly 602. In the two rotor assembly illustrated in FIG. 10, rotational coupler 1002 couples outer hub 930 to inner hub 920 at a point or orientation where rotor blade 604 is diametrically opposite to rotor blade 605 about the axis of rotation (which is into and out of the page). In one embodiment, rotational coupler 1002 may comprise a tab 1004 or projection on outer hub 930 that engages with a corresponding tab 1010 or projection on inner hub 920. Tab 1010 on inner hub 920 may extend from blade grip 924, and tab 1004 on outer hub 930 may extend from body member 932 at a position that is opposite blade grip 934 about the axis of rotation (see FIG. 9). Assume in this example that inner hub 920 is driven to rotate counter-clockwise as indicated by arrow 1020 for vertical flight. As inner hub 920 rotates, tab 1010 of inner hub 920 will likewise rotate counter-clockwise and engage with tab 1004 on outer hub 930. When tab 1010 on inner hub 920 engages with tab 1004 on outer hub 930, outer hub 930 will be linked to inner hub 920 as a unit so that they rotate at the same speed. The rotation of inner hub 920 and outer hub 930 as a unit will allow for vertical flight.

When hub assembly 602 stops rotating for wing-borne flight, inner hub 920 will stop. It is assumed in this embodiment that inner hub 920 is stopped so that tab 1010 of inner hub 920 is at the location indicated in FIG. 11. During wing-borne flight in the direction indicated by arrow 1110, the drag force will cause outer hub 930 to rotate in relation to inner hub 920 (which is stopped) in the direction indicated by arrow 1108. Hub assembly 602 may also include a rotational coupler 1102 that couples outer hub 930 to inner hub 920 at a certain point along the axis of rotation of hub assembly 602 so that rotor blade 604 is vertically stacked with rotor blade 605. In one embodiment, rotational coupler 1102 may comprise a tab 1104 or projection on outer hub 930 that engages with tab 1010 on inner hub 920. Tab 1010 on inner hub 920 may extend from blade grip 924, and tab 1104 on outer hub 930 may extend from blade grip 934 so that blade grips 924, 934 are substantially aligned when tab 1104 engages tab 1010 (see FIG. 9). Tab 1104 is separated from tab 1004 along an arc of outer hub 930 by about 180°. As outer hub 930 rotates, such as due to the drag force, tab 1104 will engage with tab 1010 of inner hub 920. When tab 1104 engages with tab 1010, outer hub 930 will be linked to inner hub 920 as a unit so that outer hub 930 stops rotating. When outer hub 930 stops rotating, rotor blade 604 will be vertically stacked with rotor blade 605.

Due to the implementation of rotational couplers 1002 and 1102, outer hub 930 is able to rotate along a semicircular arc around the axis of rotation of hub assembly 602 in relation to inner hub 920. This means that rotor blade 604 will be about 180° from rotor blade 605 when hub assembly 602 is rotating, and will be about 0° (i.e., rotor blades 604-605 are stacked) when hub assembly 602 is stopped. That way, rotor assembly 110 can be deployed and used for vertical flight, and can be folded during wing-borne flight with a more compact profile as the rotor blades 604-605 are stacked on top of each other.

FIGS. 12-27 illustrate examples of various configurations of rotor assembly 110.

Example 1

Figure 12:
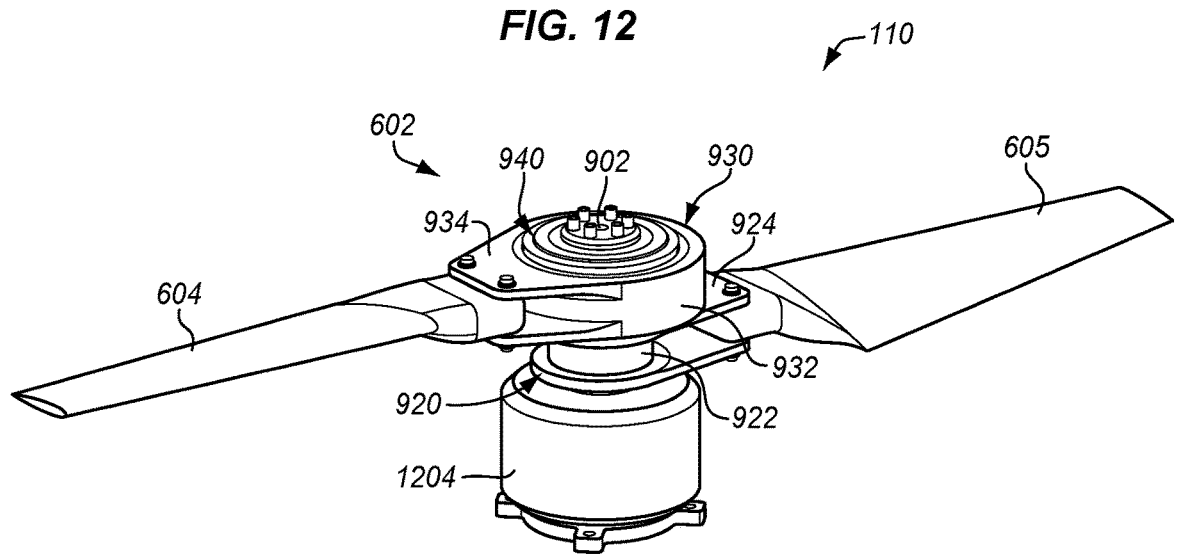
FIG. 12 is an isometric view of a rotor assembly in a deployed configuration in an exemplary embodiment.

FIG. 12 is an isometric view of a rotor assembly 110 in a deployed configuration in an exemplary embodiment. Hub assembly 602 is mounted on output shaft 902, which is a cylindrical shaft which extends upwards from a motor 1204 and is driven to rotate by motor 1204. As above, hub assembly 602 includes inner hub 920 and outer hub 930. Body member 922 of inner hub 920 slides onto output shaft 902, and is rigidly affixed to output shaft 902. Blade grip 924 of inner hub 920 attaches to one end of rotor blade 605. Blade grip 924 is rigidly affixed to rotor blade 605 in this embodiment, such as with a plurality of bolts, but may be pivotally affixed to rotor blade 605 in other embodiments.

Body member 932 of outer hub 930 is mounted on inner hub 920 via angular contact bearing(s) 940 so that outer hub 930 rotates in relation to inner hub 920. Blade grip 934 of outer hub 930 attaches to one end of rotor blade 604. Blade grip 934 is rigidly affixed to rotor blade 604 in this embodiment, but may be pivotally affixed to rotor blade 604 in other embodiments.

Figure 13:
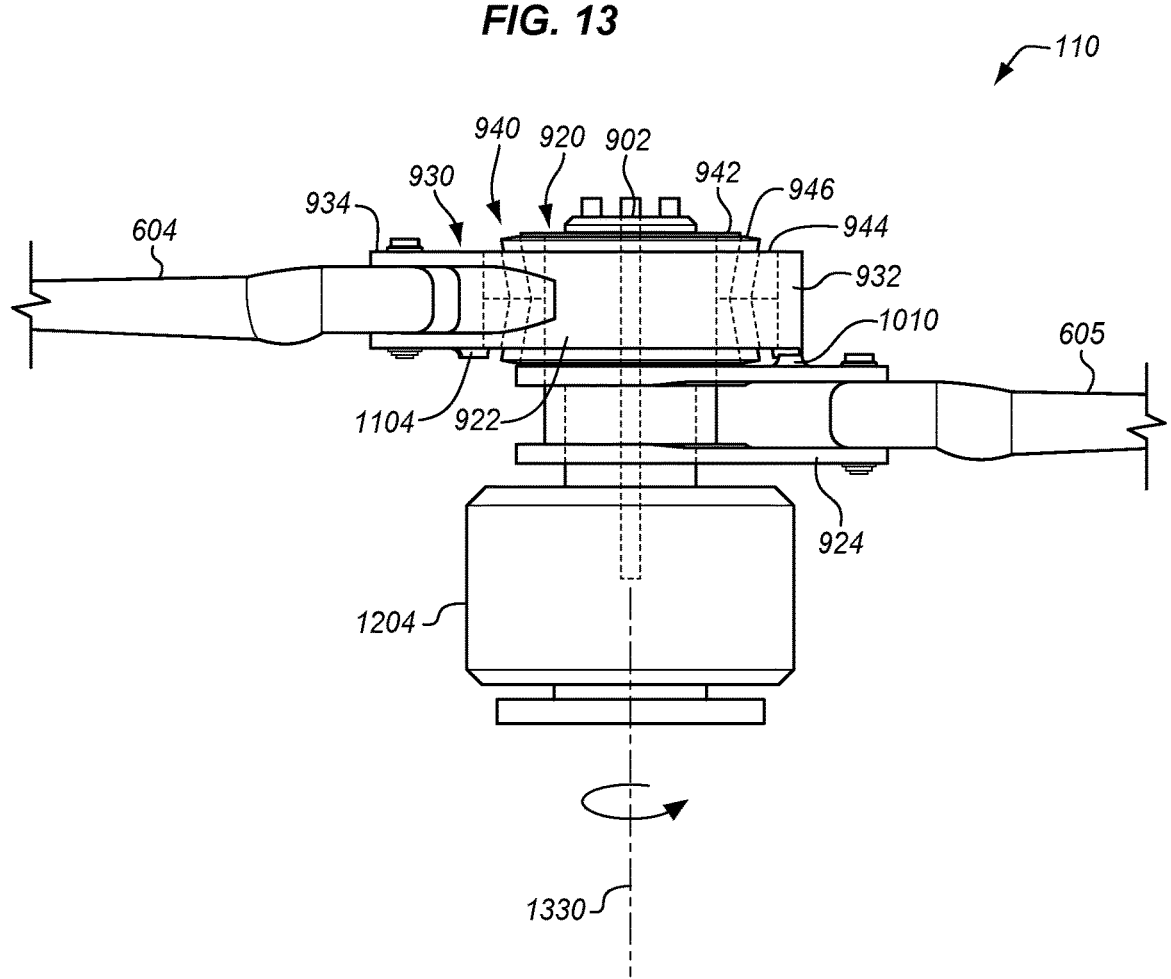
FIG. 13 is a side view of a rotor assembly in a deployed configuration in an exemplary embodiment.

FIG. 13 is a side view of rotor assembly 110 in a deployed configuration in an exemplary embodiment. Due to the way inner hub 920 and outer hub 930 are mounted, rotor blades 604-605 are on different horizontal planes when deployed. In this embodiment, inner hub 920 is mounted above motor 1204 and blade grip 924 secures rotor blade 605 on a first horizontal plane. Outer hub 930 is mounted on inner hub 920 and blade grip 934 secures rotor blade 604 on a second horizontal plane that is different than the first horizontal plane of rotor blade 605. This view further illustrates how outer hub 930 is mounted on inner hub 920 via angular contact bearing 940. Inner race 942 of angular contact bearing 940 is mounted on inner hub 920, or more particularly, on a cylindrical outer surface 928 of inner hub 920 (see FIG. 9). Outer race 944 is mounted in body member 932 of outer hub 930. With this arrangement, inner hub 920 is directly driven to rotate due to its rigid connection with output shaft 902. Because outer hub 930 is mounted on angular contact bearing 940, outer hub 930 is not directly driven by output shaft 902. To impart the rotation of output shaft 902 to outer hub 930, tab 1010 on inner hub 920 engages with tab 1004 on outer hub 930 (not visible in FIG. 13) when blade grip 934 of outer hub 930 is diametrically opposite to blade grip 924 of inner hub 920 about the axis 1330 of rotation. As described above, rotor blades 604-605 are about 180° apart when deployed. Thus, tab 1010 of inner hub 920 engages with tab 1004 of outer hub 930 when rotor blades 604-605 are about 180° apart.

Figure 14:
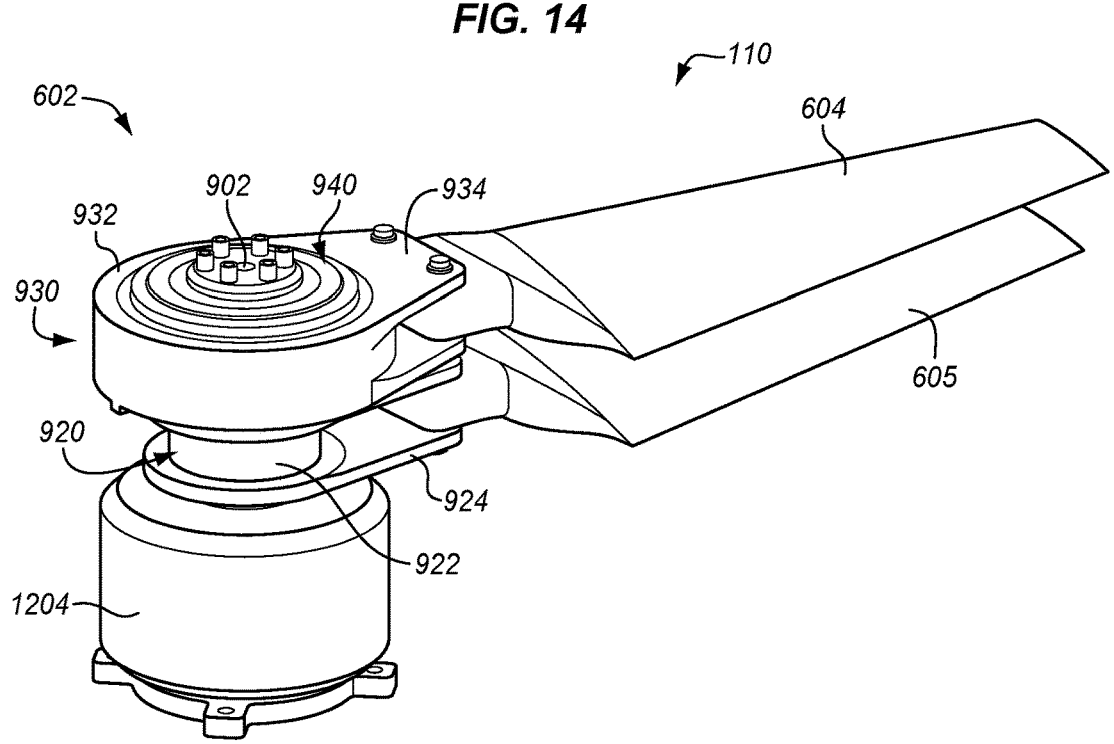
FIG. 14 is an isometric view of a rotor assembly in a folded configuration in an exemplary embodiment.
Figure 15:
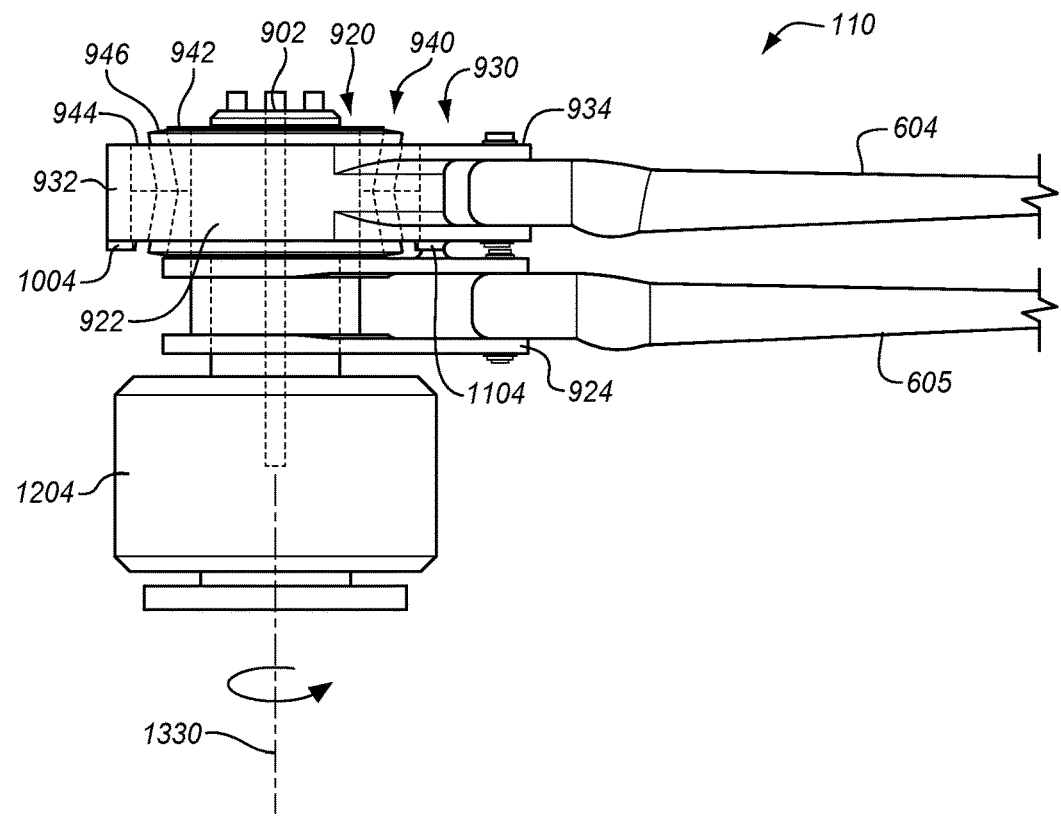
FIG. 15 is a side view of a rotor assembly in a folded configuration in an exemplary embodiment.

FIG. 14 is an isometric view of rotor assembly 110 in a folded configuration in an exemplary embodiment. When aircraft 100 transitions to wing-borne flight, inner hub 920 is stopped and outer hub 930 is able to rotate in relation to inner hub 920 on angular contact bearing 940 until rotor blade 604 is vertically aligned with rotor blade 605. FIG. 15 is a side view of rotor assembly 110 in a folded configuration in an exemplary embodiment. When outer hub 930 rotates in relation to inner hub 920, tab 1104 on outer hub 930 engages with tab 1010 on inner hub 920 (not visible in FIG. 15) when blade grip 934 of outer hub 930 is vertically aligned with blade grip 924 of inner hub 920. As described above, rotor blades 604-605 are vertically stacked when rotor assembly 110 is folded. Thus, tab 1104 on outer hub 930 engages with tab 1010 on inner hub 920 when rotor blade 604 is stacked above rotor blade 605. FIG. 15 also illustrates tab 1004 on outer hub 930 that couples outer hub 930 to inner hub 920 when blade grip 934 of outer hub 930 is diametrically opposite to blade grip 924 of inner hub 920 about the axis 1330 of rotation, which was not visible in FIG. 13.

Example 2

Figure 16:
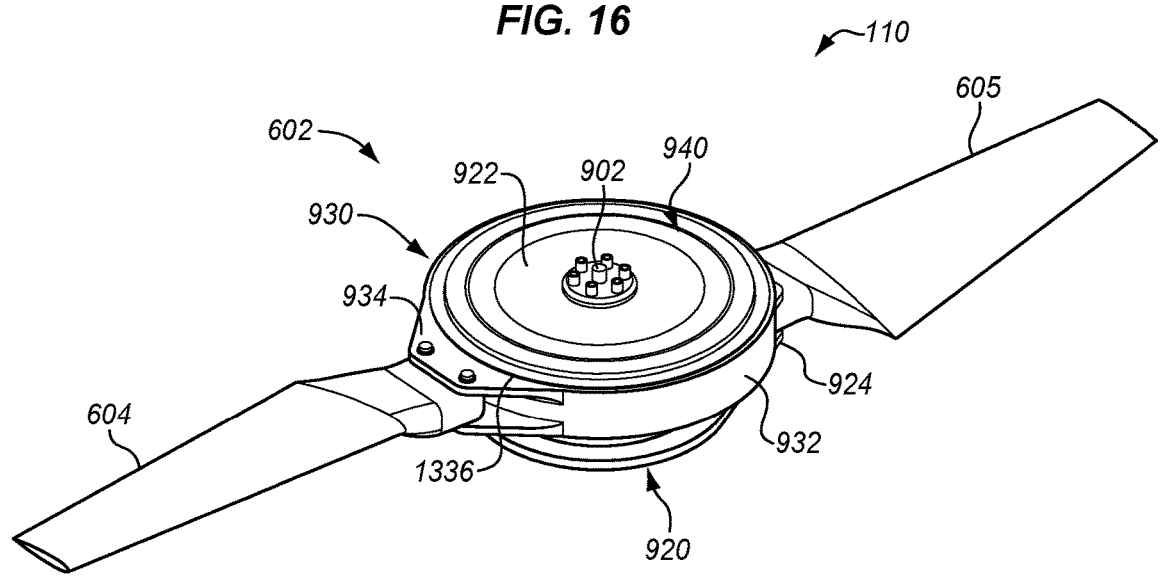
FIG. 16 is an isometric view of a rotor assembly in a deployed configuration in an exemplary embodiment.

FIG. 16 is an isometric view of a rotor assembly 110 in a deployed configuration in another exemplary embodiment. Hub assembly 602 is mounted on output shaft 902 of a motor (not visible). As above, hub assembly 602 includes inner hub 920 and outer hub 930. Body member 922 of inner hub 920 slides onto output shaft 902, and is rigidly affixed to output shaft 902. Blade grip 924 of inner hub 920 attaches to one end of rotor blade 605. Body member 932 of outer hub 930 is mounted on inner hub 920 via angular contact bearing(s) 940 so that outer hub 930 rotates in relation to inner hub 920. Blade grip 934 of outer hub 930 attaches to one end of rotor blade 604.

Figure 17:
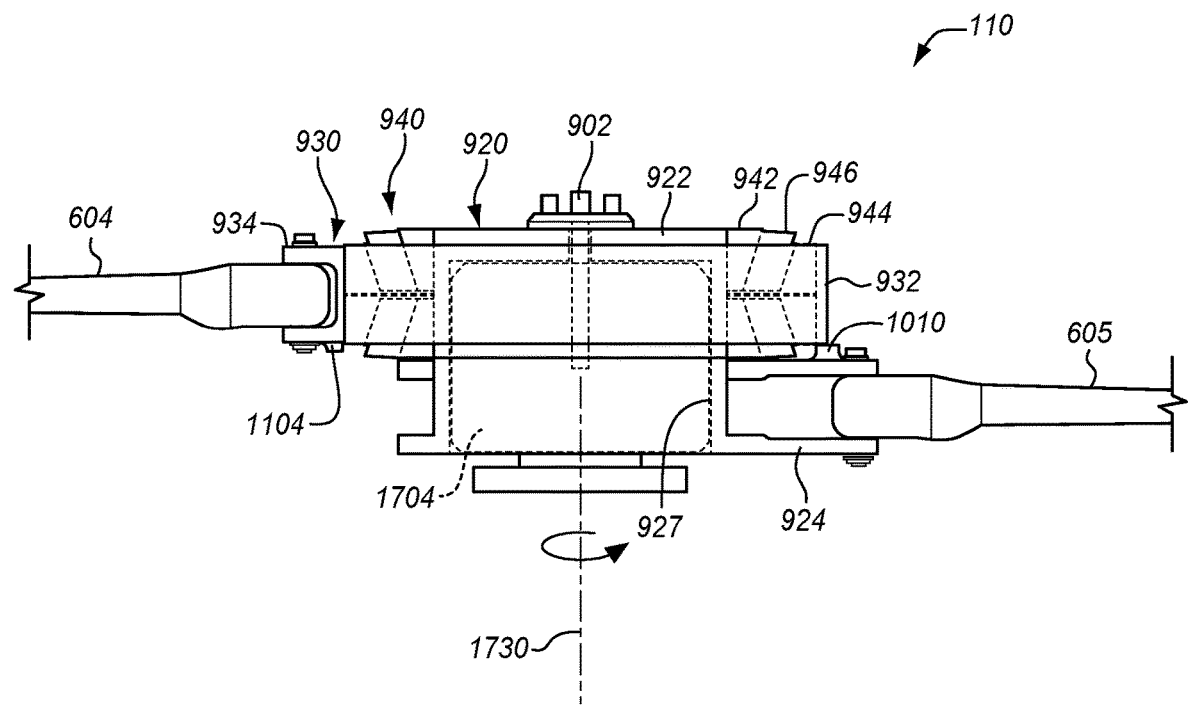
FIG. 17 is a side view of a rotor assembly in a deployed configuration in an exemplary embodiment.

FIG. 17 is a side view of rotor assembly 110 in a deployed configuration in an exemplary embodiment. In this embodiment, cylindrical aperture 927 in body member 922 of inner hub 920 encompasses or surrounds a motor 1704 that drives output shaft 902. If motor 1704 is an outrunner type motor, then body member 922 of inner hub 920 may be rigidly affixed to an outer casing of motor 1704. If motor 1704 is an inrunner type motor, then cylindrical aperture 927 may have a slightly larger diameter than an outer casing of motor 1704 so that inner hub 920 is able to rotate around motor 1704. Due to the way inner hub 920 and outer hub 930 are mounted, rotor blades 604-605 are on different horizontal planes when deployed. In this embodiment, inner hub 920 is mounted around motor 1704 and blade grip 924 secures rotor blade 605 on a first horizontal plane. Outer hub 930 is mounted on inner hub 920 and blade grip 934 secures rotor blade 604 on a second horizontal plane that is different than the first horizontal plane of rotor blade 605. This view further illustrates how outer hub 930 is mounted on inner hub 920 via angular contact bearing 940. Inner race 942 of angular contact bearing 940 is mounted on inner hub 920, or more particularly, on a cylindrical outer surface 928 of inner hub 920 (see FIG. 9). Outer race 944 is mounted in body member 932 of outer hub 930. With this arrangement, inner hub 920 is directly driven to rotate due to its rigid connection with output shaft 902 (and possibly with its rigid connection with the outer casing of motor 1704). Because outer hub 930 is mounted on angular contact bearing 940, outer hub 930 is not directly driven by output shaft 902. To impart the rotation of output shaft 902 to outer hub 930, tab 1010 on inner hub 920 engages with tab 1004 on outer hub 930 (not visible in FIG. 17) when blade grip 934 of outer hub 930 is diametrically opposite to blade grip 924 of inner hub 920 about the axis 1730 of rotation. As described above, rotor blades 604-605 are about 180° apart when deployed. Thus, tab 1010 of inner hub 920 engages with tab 1004 of outer hub 930 when rotor blades 604-605 are about 180° apart. Because inner hub 920 encompasses and is able to rotate around motor 1704, rotor blades 604-605 are situated below (i.e., do not extend above) the height of motor 1704. Thus, the vertical profile of rotor assembly 110 is reduced in this embodiment as compared to other rotor assemblies, which reduces drag during wing-borne flight.

Figure 18:
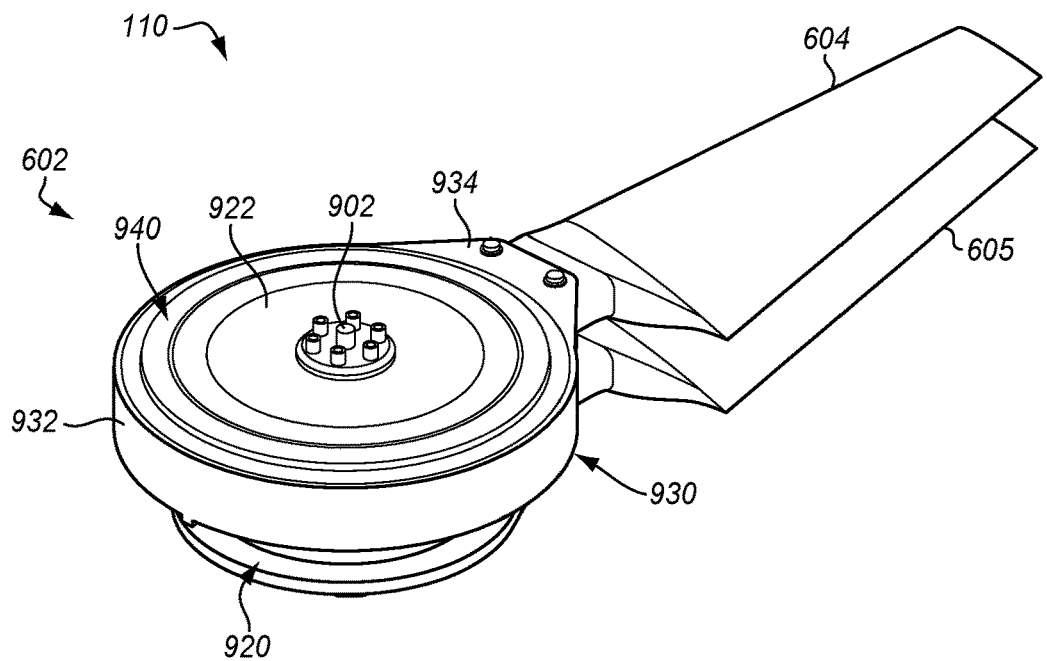
FIG. 18 is an isometric view of a rotor assembly in a folded configuration in an exemplary embodiment.
Figure 19:
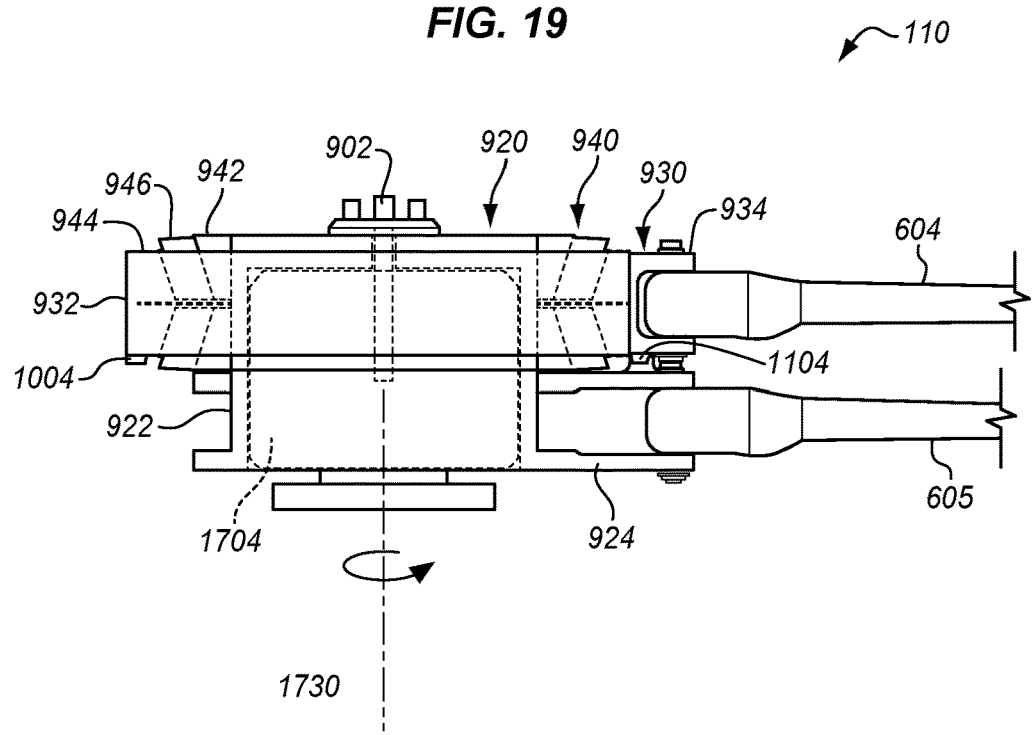
FIG. 19 is a side view of a rotor assembly in a folded configuration in an exemplary embodiment.

FIG. 18 is an isometric view of rotor assembly 110 in a folded configuration in an exemplary embodiment. When aircraft 100 transitions to wing-borne flight, inner hub 920 is stopped and outer hub 930 is able to rotate in relation to inner hub 920 on angular contact bearing 940 until rotor blade 604 is vertically aligned with rotor blade 605. FIG. 19 is a side view of rotor assembly 110 in a folded configuration in an exemplary embodiment. When outer hub 930 rotates in relation to inner hub 920, tab 1104 on outer hub 930 engages with tab 1010 on inner hub 920 (not visible in FIG. 19) when blade grip 934 of outer hub 930 is vertically aligned with blade grip 924 of inner hub 920. As described above, rotor blades 604-605 are vertically stacked when rotor assembly 110 is folded. Thus, tab 1104 on outer hub 1014 engages with tab 1010 on inner hub 920 so that rotor blade 604 is stacked above rotor blade 605. FIG. 19 also illustrates tab 1004 on outer hub 930 that couples outer hub 930 to inner hub 920 when blade grip 934 of outer hub 930 is diametrically opposite to blade grip 924 of inner hub 920 about the axis 1730 of rotation, which was not visible in FIG. 17.

Example 3

Figure 20:
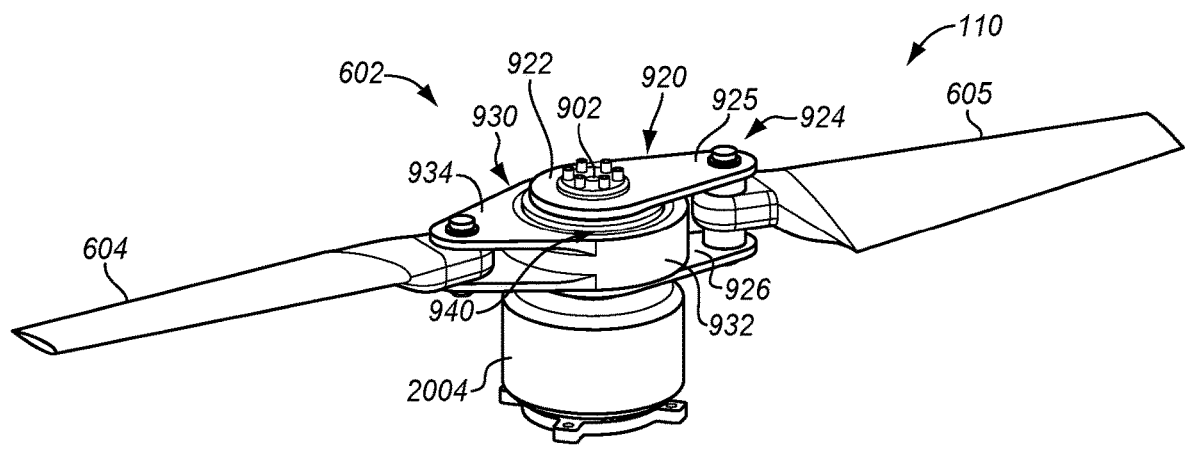
FIG. 20 is an isometric view of a rotor assembly in a deployed configuration in an exemplary embodiment.

FIG. 20 is an isometric view of a rotor assembly 110 in a deployed configuration in another exemplary embodiment. Hub assembly 602 is mounted on output shaft 902 of a motor 2004. As above, hub assembly 602 includes inner hub 920 and outer hub 930. Body member 922 of inner hub 920 slides onto output shaft 902, and is rigidly affixed to output shaft 902. Blade grip 924 of inner hub 920 attaches to one end of rotor blade 605. Blade grip 924 includes a pair of arms 925-926 that extend from body member 922 with a gap between the arms 925-926. Body member 932 of outer hub 930 is mounted on inner hub 920 via angular contact bearing(s) 940 so that outer hub 930 rotates in relation to inner hub 920. Blade grip 934 of outer hub 930 attaches to one end of rotor blade 604. In this embodiment, the gap between arms 925-926 of blade grip 924 is widened so that outer hub 930 is mounted on angular contact bearing 940 between arms 925-926.

Figure 21:
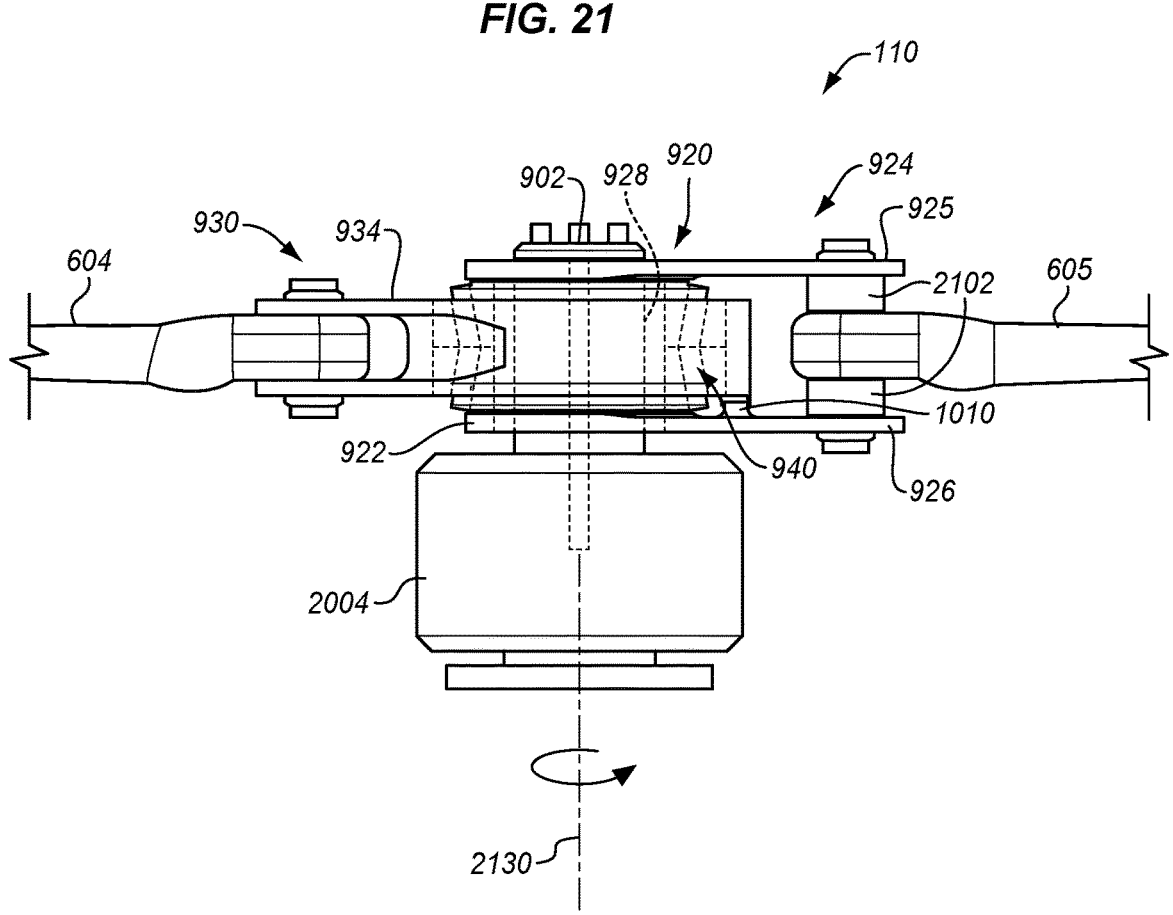
FIG. 21 is a side view of a rotor assembly in a deployed configuration in an exemplary embodiment.

FIG. 21 is a side view of rotor assembly 110 in a deployed configuration in an exemplary embodiment. In this embodiment, cylindrical outer surface 928 of inner hub 920 is between arms 925-926 of blade grip 924 (see FIG. 9). Angular contact bearing 940 is mounted on cylindrical outer surface 928 between arms 925-926, and outer hub 930 is mounted on angular contact bearing 940. Thus, outer hub 930 rotates between arms 925-926 of blade grip 924. To accommodate the wider gap between arms 925-926, blade grip 924 may attach to rotor blade 905 using one or more spacers 2102. Due to the way inner hub 920 and outer hub 930 are mounted, rotor blades 604-605 are on the same plane or about the same plane when deployed. The height of spacers 2102 may be adjusted so that rotor blade 605 is substantially on the same plane as rotor blade 604.

With this arrangement, inner hub 920 is directly driven to rotate due to its rigid connection with output shaft 902. Because outer hub 930 is mounted on angular contact bearing 940, outer hub 930 is not directly driven by output shaft 902. To impart the rotation of output shaft 902 to outer hub 930, tab 1010 on inner hub 920 engages with tab 1004 on outer hub 930 (not visible in FIG. 21) when blade grip 934 of outer hub 930 is diametrically opposite to blade grip 924 of inner hub 920 about the axis 2130 of rotation. As described above, rotor blades 604-605 are about 180° apart when deployed. Thus, tab 1010 of inner hub 920 engages with tab 1004 of outer hub 930 when rotor blades 604-605 are about 180° apart.

Figure 22:
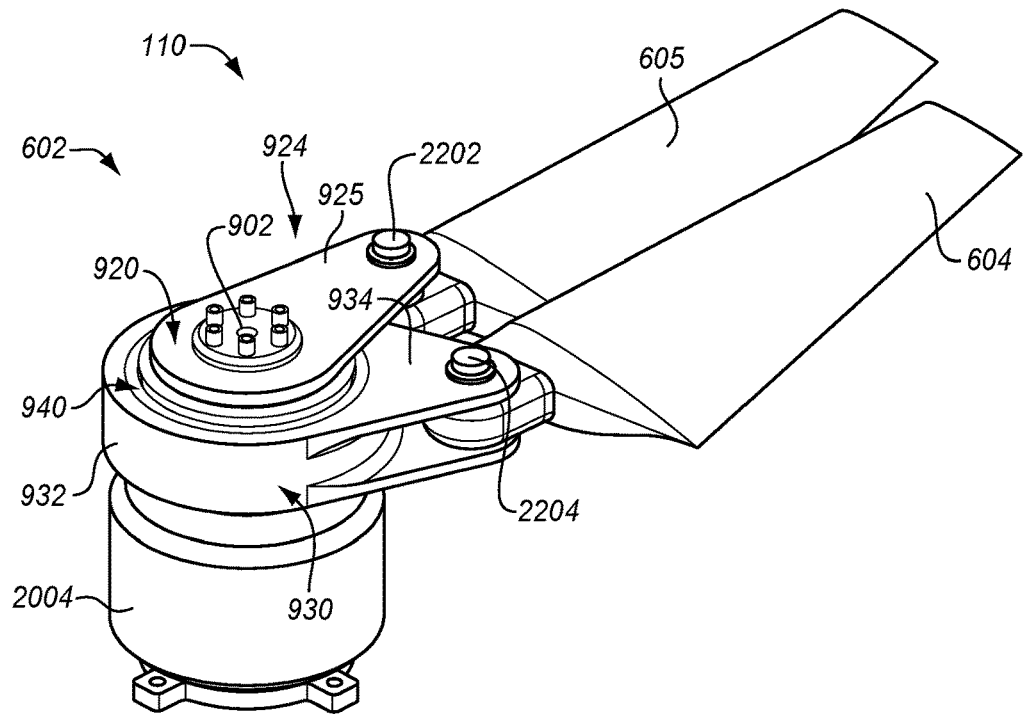
FIG. 22 is an isometric view of a rotor assembly in a folded configuration in an exemplary embodiment.
Figure 23:
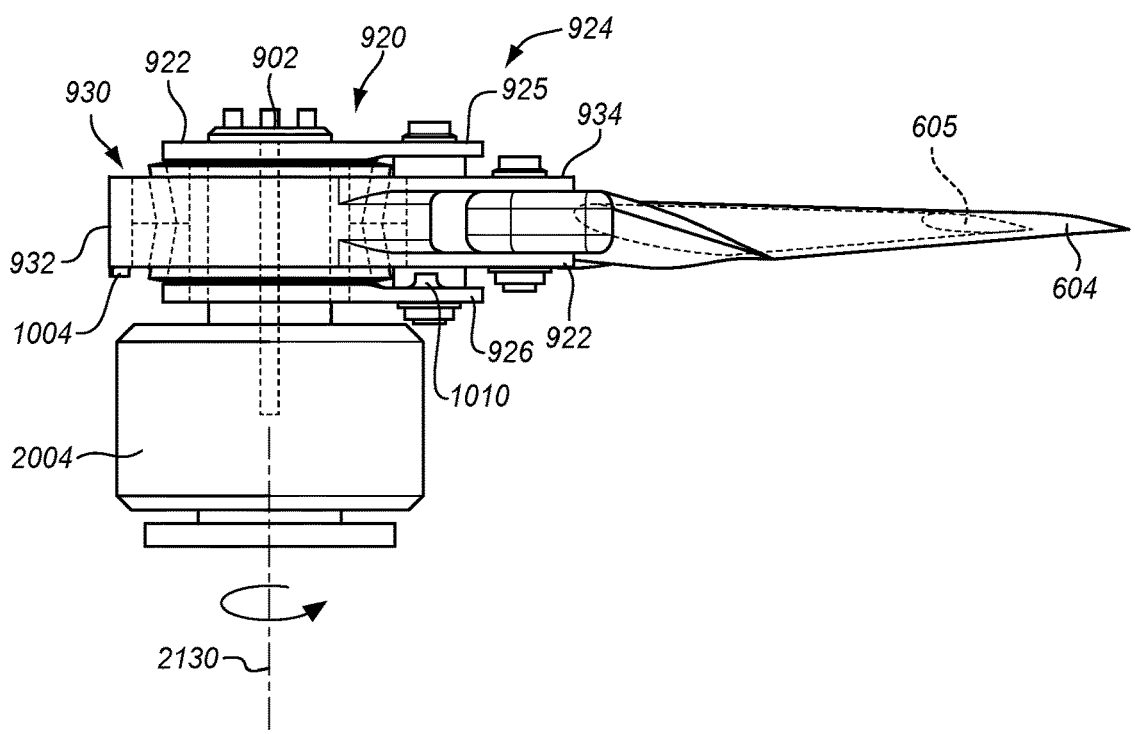
FIG. 23 is a side view of a rotor assembly in a folded configuration in an exemplary embodiment.

FIG. 22 is an isometric view of rotor assembly 110 in a folded configuration in an exemplary embodiment. When aircraft 100 transitions to wing-borne flight, inner hub 920 is stopped and outer hub 930 is able to rotate in relation to inner hub 920 on angular contact bearing 940 until rotor blade 604 is almost vertically aligned with rotor blade 605. In this embodiment, blade grip 924 may have a pivotable attachment 2202 with rotor blade 605, and/or blade grip 934 may have a pivotable attachment 2204 with rotor blade 604. FIG. 23 is a side view of rotor assembly 110 in a folded configuration in an exemplary embodiment. When outer hub 930 rotates in relation to inner hub 920 (counterclockwise), blade grip 934 of outer hub 930 engages with blade grip 924 of inner hub 920. Because outer hub 930 is situated between arms 925-926 of blade grip 924, outer hub 930 may not be able to rotate far enough so that rotor blade 604 is vertically aligned with rotor blade 605. To assist with alignment of rotor blade 604 with rotor blade 605, rotor blade 604 may pivot in relation to blade grip 934 due to the drag force of wing-borne flight to vertically align with rotor blade 605.

Example 4

Figure 24:
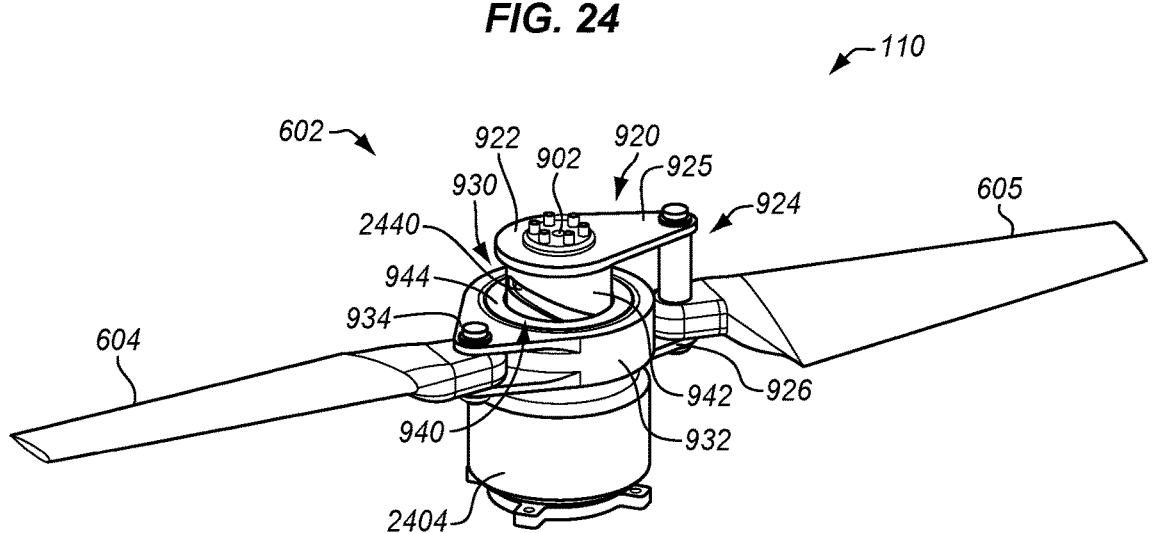
FIG. 24 is an isometric view of a rotor assembly in a deployed configuration in an exemplary embodiment.

FIG. 24 is an isometric view of a rotor assembly 110 in a deployed configuration in another exemplary embodiment. Hub assembly 602 is mounted on output shaft 902 of a motor 2404. As above, hub assembly 602 includes inner hub 920 and outer hub 930. Body member 922 of inner hub 920 slides onto output shaft 902, and is rigidly affixed to output shaft 902. Blade grip 924 of inner hub 920 attaches to one end of rotor blade 605. Blade grip 924 includes a pair of arms 925-926 that extend from body member 922 with a gap between the arms 925-926. Body member 932 of outer hub 930 is mounted on inner hub 920 via angular contact bearing(s) 940 so that outer hub 930 rotates in relation to inner hub 920. Blade grip 934 of outer hub 930 attaches to one end of rotor blade 604. In this embodiment, the gap between arms 925-926 of blade grip 924 is widened so that outer hub 930 is mounted on angular contact bearing 940 between arms 925-926. Also, angular contact bearing 940 has a sloped slot 2440 that provides axial translation of outer race 944 in relation to inner race 942 due to rotation in one direction (e.g., clockwise).

Figure 25:
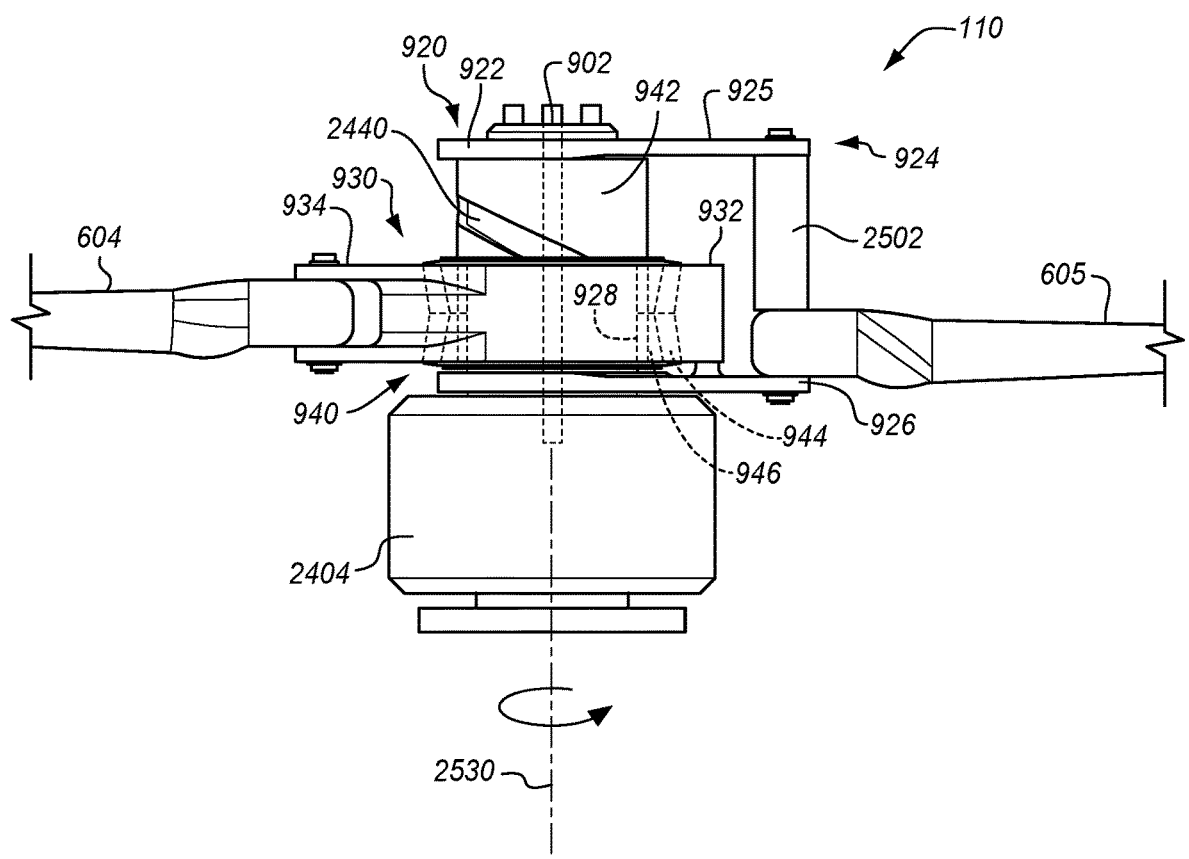
FIG. 25 is a side view of a rotor assembly in a deployed configuration in an exemplary embodiment.

FIG. 25 is a side view of rotor assembly 110 in a deployed configuration in an exemplary embodiment. In this embodiment, cylindrical outer surface 928 of inner hub 920 is between arms 925-926 of blade grip 924 (see FIG. 9). Angular contact bearing 940 is mounted on cylindrical outer surface 928 between arms 925-926, and outer hub 930 is mounted on angular contact bearing 940. Thus, outer hub 930 rotates between arms 925-926 of blade grip 924. To accommodate the wider gap between arms 925-926, blade grip 924 may attach to rotor blade 905 using one or more spacers 2502. Due to the way inner hub 920 and outer hub 930 are mounted, rotor blades 604-605 are on the same plane or about the same plane when deployed. The height of spacers 2502 may be adjusted so that rotor blade 605 is on the same plane as rotor blade 604.

With this arrangement, inner hub 920 is directly driven to rotate due to its rigid connection with output shaft 902. Because outer hub 930 is mounted on angular contact bearing 940, outer hub 930 is not directly driven by output shaft 902. To impart the rotation of output shaft 902 to outer hub 930, one end of slot 2440 on inner race 942 engages with a tab (not visible) on outer race 944 when blade grip 934 of outer hub 930 is diametrically opposite to blade grip 924 of inner hub 920 about the axis 2530 of rotation. As described above, rotor blades 604-605 are about 180° apart when deployed. Thus, the end of slot 2440 of inner race 942 engages with a tab of outer race 944 when rotor blades 604-605 are about 180° apart.

Figure 26:
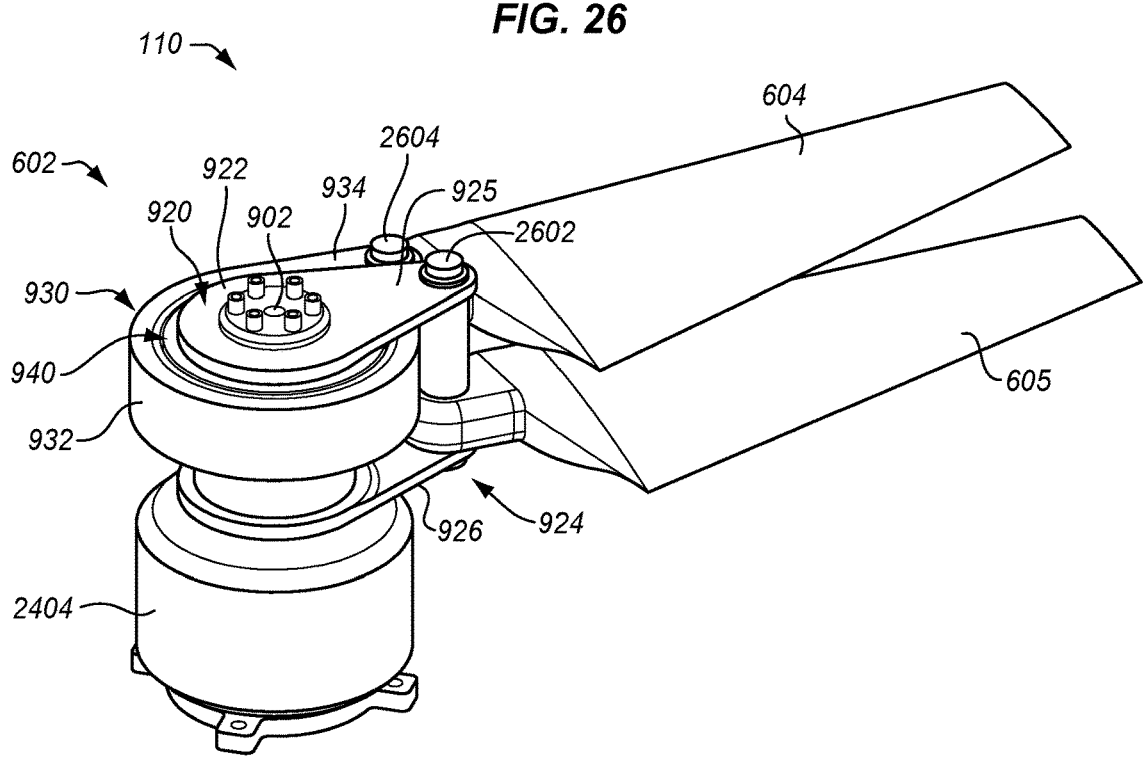
FIG. 26 is an isometric view of a rotor assembly in a folded configuration in an exemplary embodiment.
Figure 27:
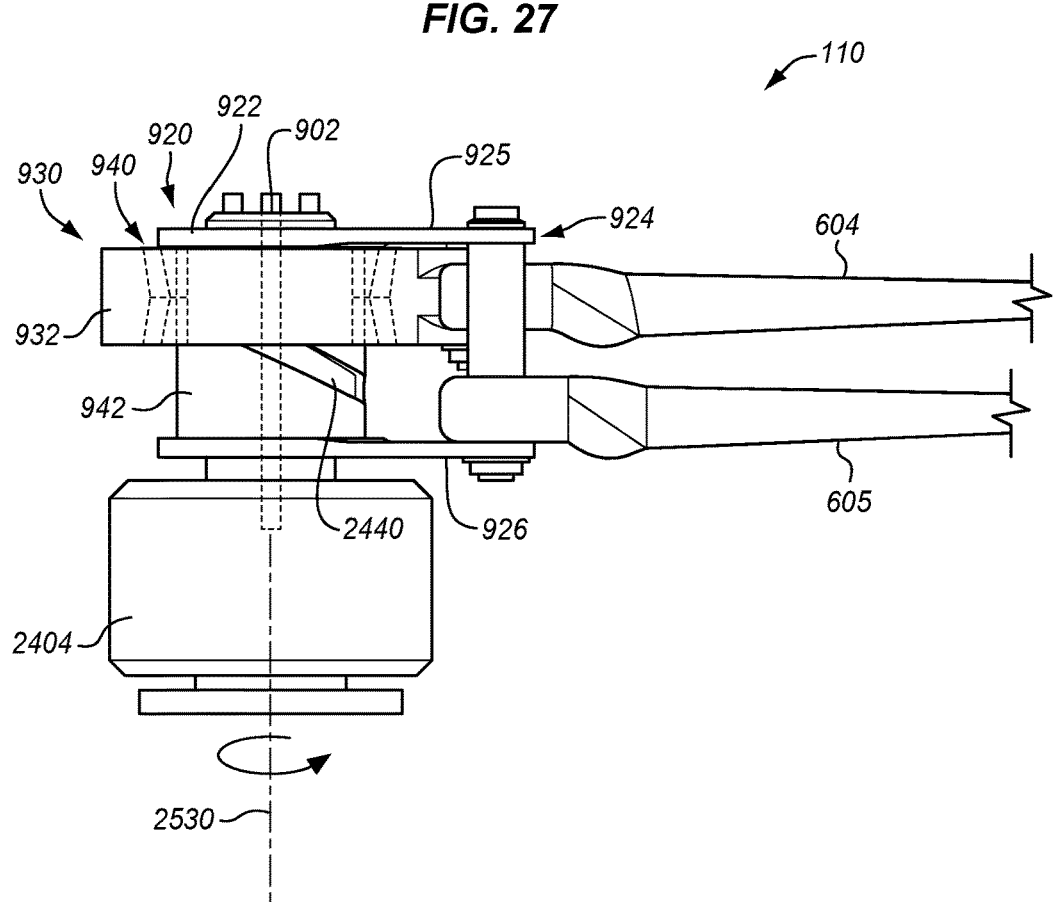
FIG. 27 is a side view of a rotor assembly in a folded configuration in an exemplary embodiment.

FIG. 26 is an isometric view of rotor assembly 110 in a folded configuration in an exemplary embodiment. When aircraft 100 transitions to wing-borne flight, inner hub 920 is stopped and outer hub 930 is able to rotate (clockwise) in relation to inner hub 920 on angular contact bearing 940 until rotor blade 604 is vertically aligned with rotor blade 605. When outer hub 930 rotates in relation to inner hub 920, outer hub 930 vertically translates due to sloped slot 2440 in inner race 942. The tab (not visible) in outer race 944 slides in sloped slot 2440 as outer hub 930 rotates. Due to the slope in sloped slot 2440, outer hub 930 will vertically translate (i.e., raise) in the axial direction as it rotates until rotor blade 604 is almost vertically aligned with rotor blade 605. In this embodiment, blade grip 924 may have a pivotable attachment 2602 with rotor blade 605, and/or blade grip 934 may have a pivotable attachment 2604 with rotor blade 604. FIG. 27 is a side view of rotor assembly 110 in a folded configuration in an exemplary embodiment. When outer hub 930 rotates in relation to inner hub 920 (clockwise), the other end of slot 2440 on inner race 942 engages with a tab (not visible) on outer race 944 when blade grip 934 of outer hub 930 is almost vertically aligned with rotor blade 605. Because outer hub 930 is situated between arms 925-926 of inner hub 920, outer hub 930 may not be able to rotate far enough so that rotor blade 604 is vertically aligned with rotor blade 605. To assist with alignment of rotor blade 604 with rotor blade 605, blade grip 934 of outer hub 930 may be pivotally coupled with rotor blade 605. Thus, rotor blade 604 may pivot in relation to blade grip 934 due to the drag force of wing-borne flight to vertically align with rotor blade 605. Also, because outer hub 930 vertically translates, rotor blade 604 is moved to a different plane than rotor blade 605 when hub assembly 602 is folded.

Figure 28:
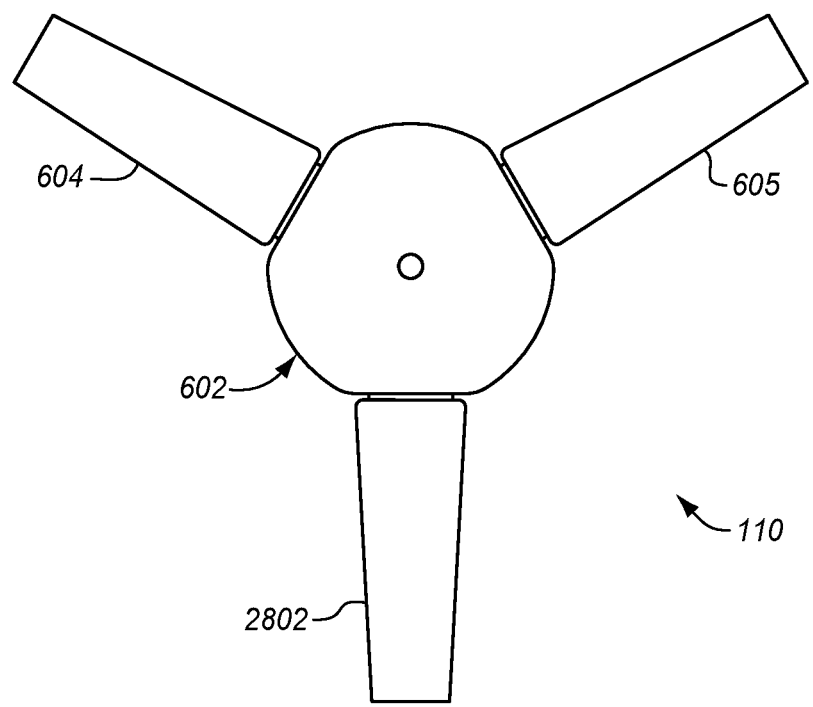
FIG. 28 is top view of a rotor assembly with three rotor blades in an exemplary embodiment.

The embodiments described above were for a two-rotor assembly. However, the concepts described here may apply also to assemblies with more than two rotors. FIG. 28 is top view of a rotor assembly 110 with three rotor blades in an exemplary embodiment. In this embodiment, rotor assembly 110 includes a hub assembly 602 and rotor blades 604-605 and 2802. Hub assembly 602 orients rotor blades 604-605 and 2802 at different azimuthal positions about the axis of rotation of hub assembly 602, which is into and out of the page in FIG. 28. Assume, for example, that hub assembly 602 orients rotor blade 604 at a first azimuthal position in relation to rotor blade 605 about the axis of rotation of hub assembly 602 when hub assembly 602 rotates for vertical flight, and orients rotor blade 2802 at a second azimuthal position in relation to rotor blade 605 about the axis of rotation of hub assembly 602 when hub assembly 602 rotates for vertical flight. Rotor blade 605, rotor blade 604 at the first azimuthal position, and rotor blade 2802 at the second azimuthal position may be symmetric around the axis of rotation.

Figure 29:
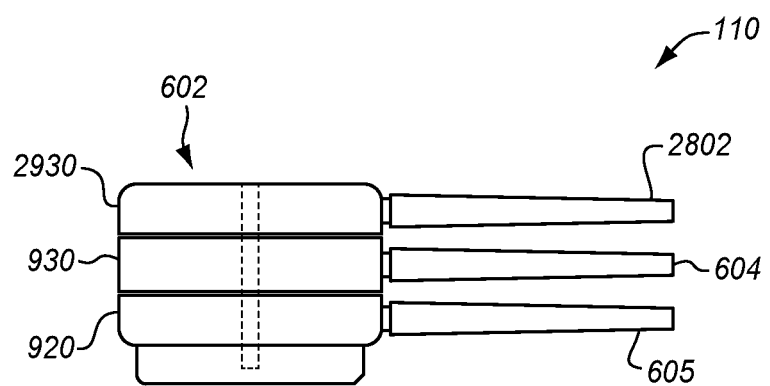
FIG. 29 is a side view of a rotor assembly in a folded configuration in an exemplary embodiment.

As with the two-rotor assemblies described above, rotor blades 604-605 and 2802 are able to fold so that they are vertically stacked for wing-borne flight. FIG. 29 is a side view of rotor assembly 110 in a folded configuration in an exemplary embodiment. The view in FIG. 29 is of a schematic of hub assembly 602. In this embodiment, hub assembly 602 may include inner hub 920, outer hub 930, and another outer hub 2930. Outer hub 930 may be mounted on inner hub 920 via an angular contact bearing 940 as described above. Likewise, outer hub 2930 may be mounted on inner hub 920 or outer hub 930 via another angular contact bearing 940. Thus, outer hub 930 is able to rotate in relation to inner hub 920, and outer hub 2930 is able to rotate in relation to inner hub 920 and outer hub 930. Due to the structure of hub assembly 602, hub assembly 602 is able to fold with rotor blades 604-605 and 2802 on different horizontal planes. Hub assembly 602 may therefore orient rotor blades 604-605 and 2802 so that rotor blade 604, rotor blade 605, and rotor blade 2802 are vertically stacked when hub assembly 602 is stopped for wing-borne flight.

Figure 30:
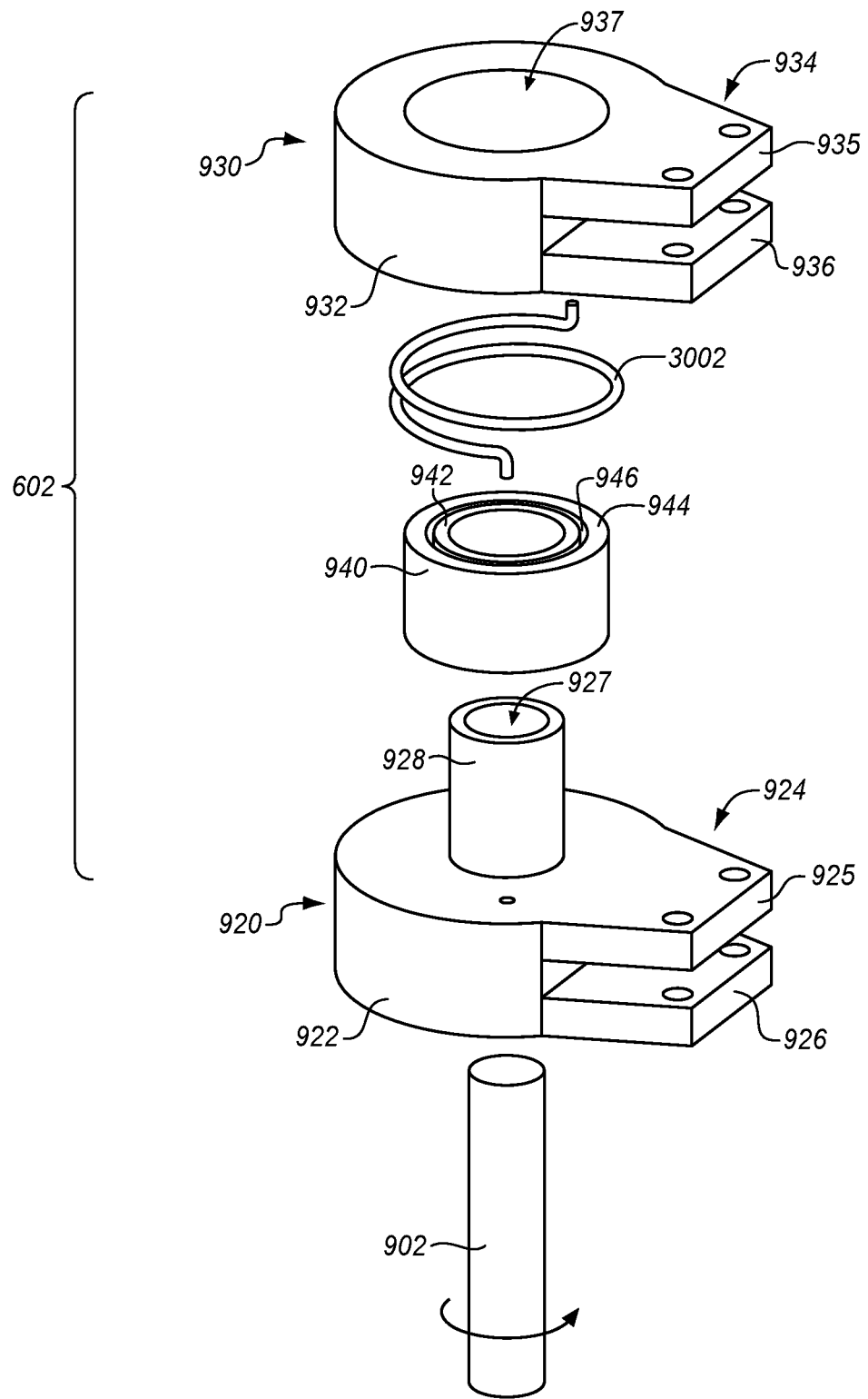
FIG. 30 is a schematic view of a hub assembly in another exemplary embodiment.

FIG. 30 is a schematic view of hub assembly 602 in an exemplary embodiment. Hub assembly 602 as shown in FIG. 30 is similar to hub assembly 602 as shown in FIG. 9, and further includes a torsion spring 3002 mounted between inner hub 920 and outer hub 930. The spring constant of torsion spring 3002 would be less than the profile drag of rotor 605, for example. When inner hub 920 rotates (e.g., counterclockwise), the rotation would overcome the spring force and cause torsion spring 3002 to twist and store mechanical energy. When inner hub 920 stops rotation, torsion spring 3002 exerts a torsion force or return force to outer hub 930 using the stored mechanical energy, which assists outer hub 930 to rotate in relation to inner hub 920 for wing-borne flight so that a rotor blade connected to outer hub 930 is vertically stacked with a rotor blade connected to inner hub 920. Torsion spring 3002 also exerts a torsion force on outer hub 930 to keep the rotor blades stacked when inner hub 920 is stopped.

Although specific embodiments were described herein, the scope is not limited to those specific embodiments. Rather, the scope is defined by the following claims and any equivalents thereof

What is claimed is:

1. A fixed-wing Vertical Take-Off and Landing (VTOL) aircraft, comprising:
   a rotor assembly that is foldable, the rotor assembly comprising:
      a hub assembly; and
      a first rotor blade attached to an inner hub of the hub assembly, and a second rotor blade attached to an outer hub of the hub assembly;
   wherein the inner hub is rigidly affixed to an output shaft of a motor, and is directly driven to rotate by the motor;
   wherein the outer hub is rotatably mounted on the inner hub;

wherein the hub assembly orients the first rotor blade and the second rotor blade as vertically stacked on different horizontal planes when the rotor assembly is stopped for wing-borne flight;

wherein the hub assembly orients the first rotor blade and the second rotor blade to project in radially opposite directions on the different horizontal planes when the rotor assembly is rotating for vertical flight.

2. The fixed-wing VTOL aircraft of claim 1 wherein:
the inner hub includes a first body member, and a first blade grip that attaches to the first rotor blade to secure the first rotor blade on a first horizontal plane; and
the outer hub includes a second body member rotatably mounted on the first body member, and a second blade grip that attaches to the second rotor blade to secure the second rotor blade on a second horizontal plane different than the first horizontal plane.

3. The fixed-wing VTOL aircraft of claim 2 wherein:
the first blade grip includes a pair of first arms that extend from the first body member with a gap between the first arms; and
the second blade grip includes a pair of second arms that extend from the second body member with a gap between the second arms.

4. The fixed-wing VTOL aircraft of claim 2 wherein:
the second body member of the outer hub is mounted on the first body member of the inner hub via an angular contact bearing.

5. The fixed-wing VTOL aircraft of claim 1 wherein the rotor assembly further comprises:
a first rotational coupler that couples the outer hub to the inner hub when the inner hub rotates so that the second rotor blade is disposed radially opposite to the first rotor blade about an axis of rotation.

6. The fixed-wing VTOL aircraft of claim 5 wherein the rotor assembly further comprises:
a second rotational coupler that couples the outer hub to the inner hub when the inner hub stops rotation so that the first rotor blade and the second rotor blade are vertically stacked.

7. The fixed-wing VTOL aircraft of claim 6 wherein:
the first rotational coupler comprises a first tab that projects from the outer hub to engage with a second tab that projects from the inner hub to couple the outer hub to the inner hub when the inner hub rotates so that the second rotor blade is radially opposite to the first rotor blade about the axis of rotation.

8. The fixed-wing VTOL aircraft of claim 7 wherein:
the second rotational coupler comprises a third tab that projects from the outer hub to engage with the second tab that projects from the inner hub to couple the outer hub to the inner hub when the inner hub stops rotation so that the first rotor blade and the second rotor blade are vertically stacked.

9. The fixed-wing VTOL aircraft of claim 6 wherein:
the outer hub is able to rotate 180° in relation to the inner hub between the first rotational coupler and the second rotational coupler.

10. The fixed-wing VTOL aircraft of claim 1 wherein:
the inner hub is mounted above the motor.

11. The fixed-wing VTOL aircraft of claim 1 wherein:
the inner hub encompasses the motor.

12. The fixed-wing VTOL aircraft of claim 1 wherein the hub assembly further includes:
a torsion spring connected between the inner hub and the outer hub that is configured to assist the outer hub to rotate in relation to the inner hub for wing-borne flight so that the second rotor blade attached to the outer hub is vertically stacked with the first rotor blade attached to the inner hub.

13. A fixed-wing Vertical Take-Off and Landing (VTOL) aircraft, comprising:
a rotor assembly configured to rotate for vertical flight of the fixed-wing VTOL aircraft, and to stop for wing-borne flight of the fixed-wing VTOL aircraft;
the rotor assembly comprising:
a hub assembly; and
a pair of rotor blades connected to the hub assembly comprising a first rotor blade attached to an inner hub of the hub assembly, and a second rotor blade attached to an outer hub of the hub assembly;
wherein the inner hub is rigidly affixed to an output shaft of a motor, and is directly driven to rotate by the motor;
wherein the outer hub is rotatably mounted on the inner hub;
when the rotor assembly is stopped for wing-borne flight, the hub assembly is configured to fold the first rotor blade and the second rotor blade opposite the direction of forward travel of the fixed-wing VTOL aircraft, with the first rotor blade and the second rotor blade vertically stacked on different horizontal planes;
when the rotor assembly rotates for vertical flight, the hub assembly is configured to orient the first rotor blade and the second rotor blade in radially opposite directions on the different horizontal planes.

14. The fixed-wing VTOL aircraft of claim 13 wherein:
the inner hub includes a first body member, and a first blade grip that attaches to the first rotor blade to secure the first rotor blade on a first horizontal plane; and
the outer hub includes a second body member rotatably mounted on the first body member, and a second blade grip that attaches to the second rotor blade to secure the second rotor blade on a second horizontal plane different than the first horizontal plane.

15. The fixed-wing VTOL aircraft of claim 14 wherein:
the first blade grip includes a pair of first arms that extend from the first body member with a gap between the first arms; and
the second blade grip includes a pair of second arms that extend from the second body member with a gap between the second arms.

16. The fixed-wing VTOL aircraft of claim 14 wherein:
the second body member of the outer hub is mounted on the first body member of the inner hub via an angular contact bearing.

17. The fixed-wing VTOL aircraft of claim 13 wherein the rotor assembly further comprises:
a first rotational coupler that couples the outer hub to the inner hub when the inner hub rotates so that the second rotor blade is disposed radially opposite to the first rotor blade about an axis of rotation.

18. The fixed-wing VTOL aircraft of claim 17 wherein the rotor assembly further comprises:
a second rotational coupler that couples the outer hub to the inner hub when the inner hub stops rotation so that the first rotor blade and the second rotor blade are vertically stacked.

19. The fixed-wing VTOL aircraft of claim 13 wherein the hub assembly further includes:
a torsion spring connected between the inner hub and the outer hub that is configured to assist the outer hub to rotate in relation to the inner hub for wing-borne flight so that the second rotor blade attached to the outer hub is vertically stacked with the first rotor blade attached to the inner hub.

20. A fixed-wing Vertical Take-Off and Landing (VTOL) aircraft, comprising:
   a rotor assembly configured to switch between a deployed configuration and a folded configuration;
   the rotor assembly comprising:
      a hub assembly; and
      a pair of rotor blades connected to the hub assembly comprising a first rotor blade attached to an inner hub of the hub assembly, and a second rotor blade attached to an outer hub of the hub assembly;
   wherein the inner hub is rigidly affixed to an output shaft of a motor, and is directly driven to rotate by the motor;
   wherein the outer hub is rotatably mounted on the inner hub;
   wherein in the folded configuration, the hub assembly orients the first rotor blade and the second rotor blade to project radially in the same direction from an axis of rotation of the hub assembly on different horizontal planes, and stacked vertically on the different horizontal planes;
   wherein in the deployed configuration, the hub assembly orients the first rotor blade and the second rotor blade to project radially in opposite directions from the axis of rotation of the hub assembly on the different horizontal planes.

* * * * *